United States Patent
Ma et al.

(10) Patent No.: US 11,356,920 B2
(45) Date of Patent: Jun. 7, 2022

(54) COMMUNICATIONS METHOD AND DEVICE HAVING VIRTUAL ACCESS POINT

(71) Applicant: HUAWEI TECHNOLOGIES CO., LTD., Shenzhen (CN)

(72) Inventors: Mengyao Ma, Shenzhen (CN); Yanchun Li, Boulogne Billancourt (FR); Xiao Han, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 93 days.

(21) Appl. No.: 16/895,181

(22) Filed: Jun. 8, 2020

(65) Prior Publication Data
US 2020/0305056 A1    Sep. 24, 2020

Related U.S. Application Data

(63) Continuation of application No. PCT/CN2018/117301, filed on Nov. 23, 2018.

(30) Foreign Application Priority Data

Dec. 11, 2017 (CN) .......................... 201711307035.X

(51) Int. Cl.
*H04W 36/32* (2009.01)
*H04W 40/24* (2009.01)
(Continued)

(52) U.S. Cl.
CPC ....... *H04W 36/32* (2013.01); *H04W 12/0431* (2021.01); *H04W 36/0038* (2013.01);
(Continued)

(58) Field of Classification Search
CPC .............. H04W 36/32; H04W 12/0431; H04W 36/0038; H04W 36/08; H04W 36/26;
(Continued)

(56) References Cited

U.S. PATENT DOCUMENTS 10,375,621 B2 * 8/2019 Li ..................... H04W 48/10
2003/0206531 A1 11/2003 Shpak
(Continued)

FOREIGN PATENT DOCUMENTS

| CN | 103326829 A | 9/2013 |
| CN | 103763742 A | 4/2014 |

(Continued)

OTHER PUBLICATIONS

IEEE, "Standard for Information technology—Telecommunications and information exchange between systems Local and metropolitan area networks—Specific requirements, Part 11: Wireless LAN Medium Access Control (MAC) and Physical Layer (PHY) Specifications Amendment 3: Enhancements for Very High Throughput in the 60 GHz Band", IEEE Std 802.11ad™—2012, Dec. 28, 2012, total 628 pages.

(Continued)

*Primary Examiner* — Magdi Elhag
(74) *Attorney, Agent, or Firm* — Maier & Maier, PLLC

(57) ABSTRACT

A communications method and device, to reduce service interruption time and signaling overheads that are generated when an access point that provides a communication service for a station changes because the station moves or changes a direction. First frames sent by different access points in an access point set to a station include a same sending address. In this way, when the station moves or changes a direction, the access point that provides the communication service for the station changes from one access point in the access point set to another access point. Because first frames sent by access points in the access point set include a same sending address, the station may consider the access point set as one access point.

13 Claims, 44 Drawing Sheets

(51) Int. Cl.
*H04W 76/11* (2018.01)
*H04W 36/00* (2009.01)
*H04W 36/08* (2009.01)
*H04W 36/26* (2009.01)
*H04W 36/30* (2009.01)
*H04W 12/0431* (2021.01)

(52) U.S. Cl.
CPC ........... *H04W 36/08* (2013.01); *H04W 36/26* (2013.01); *H04W 36/30* (2013.01); *H04W 40/24* (2013.01); *H04W 40/244* (2013.01); *H04W 76/11* (2018.02)

(58) Field of Classification Search
CPC ..... H04W 36/30; H04W 76/11; H04W 48/12; H04W 24/10; H04W 74/006; H04W 84/12; H04W 48/20; H04W 48/08; H04W 40/24; H04W 40/244; H04W 40/246; H04B 7/022; H04B 7/061
See application file for complete search history.

(56) References Cited

U.S. PATENT DOCUMENTS

| | | | |
|---|---|---|---|
| 2013/0028180 A1 | 1/2013 | Gao et al. | |
| 2014/0349581 A1 | 11/2014 | Oh et al. | |
| 2015/0023278 A1* | 1/2015 | Boccardi | H04L 5/0048 370/329 |
| 2015/0049701 A1 | 2/2015 | Tian et al. | |
| 2015/0201368 A1 | 7/2015 | Cudak et al. | |
| 2016/0156392 A1 | 6/2016 | Jung et al. | |
| 2017/0272959 A1 | 9/2017 | Tomisawa et al. | |
| 2017/0302349 A1 | 10/2017 | Sun et al. | |
| 2018/0227109 A1* | 8/2018 | Lee | H04L 5/0073 |
| 2018/0227900 A1* | 8/2018 | Akkarakaran | H04W 72/046 |
| 2018/0302922 A1* | 10/2018 | Patil | H04W 74/085 |
| 2018/0310229 A1* | 10/2018 | Li | H04W 48/16 |
| 2019/0150063 A1* | 5/2019 | Chu | H04W 48/12 370/338 |

FOREIGN PATENT DOCUMENTS

| | | |
|---|---|---|
| CN | 104540172 A | 4/2015 |
| CN | 106559107 A | 4/2017 |

OTHER PUBLICATIONS

IEEE, "P802.11ay™/D0.35, Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 7: Enhanced throughput for operation in license-exempt bands above 45 GHz", IEEE P802.11ay™/D0.35, May 2017, total 256 pages.

* cited by examiner

| Transmit-end identifier (for example, a MAC address of a control access point or a (temporary) AID of the control access point) | Receive-end identifier (for example, a MAC address of a member access point or a temporary AID of the member access point) | Message type (for example, indicating allocation of the AID of the member access point) | AID allocated to the member access point | Another parameter related to the member access point (optional) | Extension field (optional) |
|---|---|---|---|---|---|

FIG. 4a

| Transmit-end identifier (for example, a MAC address of a control access point or a (temporary) AID of the control access point) | Receive-end identifier (for example, a MAC address of a member access point or a temporary AID of the member access point) | Message type (for example, indicating management of a virtual access point) | Another element (optional) | Element type (for example, indicating allocation of the AID of the member access point) | AID allocated to the member access point | Another related parameter (optional) | Another element (optional) | Extension field (optional) |

FIG. 4b

| Another parameter in an association request frame | Quantity N of antennas supported by a member access point | Another parameter in the association request frame |
|---|---|---|

FIG. 5

| Another parameter in an association feedback frame | Antenna identifier 1 allocated to a member access point | ... | Antenna identifier N allocated to the member access point | Another parameter in the association feedback frame |
|---|---|---|---|---|

FIG. 6a

| Another parameter in an association feedback frame | Quantity N of antenna identifiers allocated to a member access point | Antenna identifier 1 allocated to the member access point | ... | Antenna identifier N allocated to the member access point | Another parameter in the association feedback frame |

FIG. 6b

| Another parameter in an association feedback frame | Antenna identifier 1 allocated to a member access point | Indication field | Antenna identifier 2 allocated to the member access point | Indication field | ... | Antenna identifier N allocated to the member access point | Indication field | Another parameter in the association feedback frame |

FIG. 6c

| Another parameter in an association feedback field | Indication field | Antenna identifier 1 allocated to a member access point | Indication field | Antenna identifier 2 allocated to the member access point | ... | Indication field | Antenna identifier N allocated to the member access point | Another parameter in the association feedback field |

FIG. 6d

| Transmit-end identifier (for example, a MAC address of a member access point or an AID of the member access point) | Receive-end identifier (for example, a MAC address of a control access point or an AID of the control access point) | Message type (for example, indicating a quantity of antennas supported by the member access point) | Quantity N of antennas supported by the member access point | Another related parameter (optional) | Extension field (optional) |
|---|---|---|---|---|---|

FIG. 7a

| Transmit-end identifier (for example, a MAC address of a member access point or an AID of the member access point) | Receive-end identifier (for example, a MAC address of a control access point or an AID of the control access point) | Message type (for example, indicating management of a virtual access point) | Another element (optional) | Element type (for example, indicating a quantity of antennas supported by the member access point) | Quantity N of antennas supported by the member access point | Another related parameter (optional) | Another element (optional) | Extension field (optional) |

FIG. 7b

| Transmit-end identifier (for example, a MAC address of a control access point or an AID of the control access point) | Receive-end identifier (for example, a MAC address of a member access point or an AID of the member access point) | Message type (for example, indicating antenna configuration of the member access point) | Antenna identifier 1 allocated to the member access point | ... | Antenna identifier N allocated to the member access point | Another related parameter (optional) | Extension field (optional) |

FIG. 8a

| Transmit-end identifier (for example, a MAC address of a control access point or an AID of the control access point) | Receive-end identifier (for example, a MAC address of a member access point or an AID of the member access point) | Message type (for example, indicating antenna configuration of the member access point) | Quantity N of antenna identifiers allocated to the member access point | Antenna identifier 1 allocated to the member access point | ... | Antenna identifier N allocated to the member access point | Another related parameter (optional) | Extension field (optional) |
|---|---|---|---|---|---|---|---|---|

FIG. 8b

| Transmit-end identifier (for example, a MAC address of a control access point or an AID of the control access point) | Receive-end identifier (for example, a MAC address of a member access point or an AID of the member access point) | Message type (for example, indicating antenna configuration of the member access point) | Indication field | Antenna identifier 1 allocated to the member access point | ... | Indication field | Antenna identifier N allocated to the member access point | Another related parameter (optional) | Extension field (optional) |

FIG. 8c

| Transmit-end identifier (for example, a MAC address of a control access point or an AID of the control access point) | Receive-end identifier (for example, a MAC address of a member access point or an AID of the member access point) | Message type (for example, indicating antenna configuration of the member access point) | Antenna identifier 1 allocated to the member access point | Indication field | ... | Antenna identifier N allocated to the member access point | Indication field | Another related parameter (optional) | Extension field (optional) |

FIG. 8d

| Transmit-end identifier (for example, a MAC address of a control access point or an AID of the control access point) |
|---|
| Receive-end identifier (for example, a MAC address of a member access point or an AID of the member access point) |
| Message type (for example, indicating management of a virtual access point) |
| Another parameter (optional) |
| Element type (for example, indicating antenna configuration of the member access point) |
| Antenna identifier 1 allocated to the member access point |
| ... |
| Antenna identifier N allocated to the member access point |
| Another related parameter (optional) |
| Another parameter (optional) |
| Extension field (optional) |

FIG. 8e

| |
|---|
| Another parameter in an association feedback frame |
| Quantity M of station AIDs allocated to a member access point |
| Station AID 1 allocated to the member access point |
| Station AID 2 allocated to the member access point |
| ... |
| Station AID M allocated to the member access point |
| Quantity S of security keys allocated to the member access point (optional) |
| Security key 1 allocated to the member access point (optional) |
| Security key 2 allocated to the member access point (optional) |
| ... |
| Security key S allocated to the member access point (optional) |
| Another parameter in the association feedback frame |

FIG. 9a

| Another parameter in an association feedback frame |
|---|
| Quantity L of station parameters allocated to a member access point |
| Station AID 1 in a station parameter 1 allocated to the member access point |
| Security key 1 in the station parameter 1 allocated to the member access point (optional) |
| Station AID 2 in a station parameter 2 allocated to the member access point |
| Security key 2 in the station parameter 2 allocated to the member access point (optional) |
| ... |
| Station AID L in a station parameter L allocated to the member access point |
| Security key L in the station parameter L allocated to the member access point (optional) |
| Another parameter in the association feedback frame |

FIG. 9b

| Another parameter in an association feedback frame | Start value of a station AID range allocated to a member access point | End value of the station AID range allocated to the member access point | Range of security keys allocated to the member access point (optional) | Another parameter (optional) | Another parameter in the association feedback frame |
|---|---|---|---|---|---|

FIG. 9c

| Another parameter in an association feedback frame | Quantity X of station AID ranges allocated to a member access point | Start value of a station AID range 1 allocated to the member access point | End value of the station AID range 1 allocated to the member access point | ... | Start value of a station AID range X allocated to the member access point | End value of the station AID range X allocated to the member access point | Quantity Y of security key ranges allocated to the member access point (optional) | Security key range 1 allocated to the member access point (optional) | ... |
|---|---|---|---|---|---|---|---|---|---|

| Security key range Y allocated to the member access point (optional) | Another parameter (optional) | Another parameter in the association feedback frame |
|---|---|---|

FIG. 9d

| Transmit-end identifier (for example, a MAC address of a control access point or an AID of the control access point) |
|---|
| Receive-end identifier (for example, a MAC address of a member access point or an AID of the member access point) |
| Message type (for example, configuration of a station parameter allocated to the member access point) |
| Quantity L of station parameters allocated to the member access point |
| Station AID 1 in a station parameter 1 allocated to the member access point |
| Security key 1 in the station parameter 1 allocated to the member access point (optional) |
| Another parameter in the station parameter 1 allocated to the member access point (optional) |
| ... |
| Station AID L in a station parameter L allocated to the member access point |
| Security key L in the station parameter L allocated to the member access point (optional) |
| Another parameter in the station parameter L allocated to the member access point (optional) |
| Extension field (optional) |

FIG. 10a

| Transmit-end identifier (for example, a MAC address of a control access point or an AID of the control access point) | Receive-end identifier (for example, a MAC address of a member access point or an AID of the member access point) | Message type (for example, indicating management of a virtual access point) | Another element (optional) | Element type (for example, configuration of a station parameter allocated to the member access point) | Quantity L of station parameters allocated to the member access point | Station AID 1 in a station parameter 1 allocated to the member access point | Security key 1 in the station parameter 1 allocated to the member access point (optional) | Another parameter in the station parameter 1 allocated to the member access point (optional) | ... |
|---|---|---|---|---|---|---|---|---|---|

| ... | Station AID L in a station parameter L allocated to the member access point | Security key L in the station parameter L allocated to the member access point (optional) | Another parameter in the station parameter L allocated to the member access point (optional) | Another element (optional) | Extension field (optional) |
|---|---|---|---|---|---|

FIG. 10b

| Transmit-end identifier (for example, a MAC address of a member access point or an AID of the member access point) | Receive-end identifier (for example, a MAC address of a control access point or an AID of the control access point) | Message type (for example, indicating a request to allocate a station parameter) | Requested station identifier (for example, a MAC address of a station) | Another related parameter (optional) | Extension field (optional) |
|---|---|---|---|---|---|

FIG. 11a

| Transmit-end identifier (for example, a MAC address of a member access point or an AID of the member access point) | Receive-end identifier (for example, a MAC address of a control access point or an AID of the control access point) | Message type (for example, indicating a request to allocate a station parameter) | Quantity N of requested stations | Identifier of a station 1 (for example, a MAC address of the station) | Another related parameter of the station 1 (optional) | ... | Identifier of a station N (for example, a MAC address of the station) | Another related parameter of the station N (optional) | Extension field (optional) |

FIG. 11b

| Transmit-end identifier (for example, a MAC address of a member access point or an AID of the member access point) |
|---|
| Receive-end identifier (for example, a MAC address of a control access point or an AID of the control access point) |
| Message type (for example, indicating management of a virtual access point) |
| Another element (optional) |
| Element type (for example, indicating a request to allocate a station parameter) |
| Quantity N of requested stations |
| Identifier of a station 1 (for example, a MAC address of the station) |
| Another related parameter of the station 1 (optional) |
| ... |
| Identifier of a station N (for example, a MAC address of the station) |
| Another related parameter of the station N (optional) |
| Another element (optional) |
| Extension field (optional) |

FIG. 11c

| Transmit-end identifier (for example, a MAC address of a control access point or an AID of the control access point) | Receive-end identifier (for example, a MAC address of a member access point or an AID of the member access point) | Message type (for example, configuration of a station parameter allocated to the member access point) | Station identifier (for example, a MAC address of a station) (optional) | Station AID of the station that is allocated to the member access point | Security key of the station that is allocated to the member access point (optional) | Another parameter of the station that is allocated to the member access point (optional) | Extension field (optional) |
|---|---|---|---|---|---|---|---|

| Transmit-end identifier (for example, a MAC address of a control access point or an AID of the control access point) | Receive-end identifier (for example, a MAC address of a member access point or an AID of the member access point) | Message type (for example, indicating management of a virtual access point) | Another element (optional) | Element type (for example, configuration of a station parameter allocated to the member access point) | Quantity N of received member access points (optional) | Identifier of a member access point 1 (for example, a MAC address of the member access point 1 or an AID of the member access point 1) | First parameter allocated to the member access point 1 | ... |
|---|---|---|---|---|---|---|---|---|

| ... | Identifier of a member access point N (for example, a MAC address of the member access point N or an AID of the member access point N) | First parameter allocated to the member access point N | Another element (optional) | Extension field (optional) |
|---|---|---|---|---|

FIG. 12e

| Transmit-end identifier (for example, a MAC address of a first access point/control access point or an AID of the first access point/control access point) | Receive-end identifier (for example, a MAC address of a second access point or an AID of the second access point) | Message type (switching an access point that serves a station) | Station AID | MAC address of the station (optional) | Security key of the station (optional) | Another parameter of the station (optional) | Another parameter related to a virtual access point (optional) | Extension field (optional) |

FIG. 17a

| Transmit-end identifier (for example, a MAC address of a first access point/control access point or an AID of the first access point/control access point) | Receive-end identifier (for example, a MAC address of a second access point or an AID of the second access point) | Message type (switching an access point that serves a station) | Quantity N of stations | AID of a station 1 | MAC address of the station 1 (optional) | Security key of the station 1 (optional) | Another parameter of the station 1 (optional) | ... |

| ... | AID of a station N | MAC address of the station N (optional) | Security key of the station N (optional) | Another parameter of the station 1 (optional) | Another parameter related to a virtual access point (optional) | Extension field (optional) |

FIG. 17b

| Transmit-end identifier (for example, a MAC address of a member access point or an AID of the member access point) | Receive-end identifier (for example, a MAC address of a control access point or an AID of the control access point) | Message type (for example, indicating a returned station parameter) | Returned station AID | Security key of a returned station (optional) | Another parameter of the returned station (optional) | Extension field (optional) |
|---|---|---|---|---|---|---|

FIG. 18a

| Transmit-end identifier (for example, a MAC address of a member access point or an AID of the member access point) | Receive-end identifier (for example, a MAC address of a control access point or an AID of the control access point) | Message type (for example, indicating a returned station parameter) | Quantity S of returned station parameter groups | Station AID in a returned station parameter group 1 | Security key in the returned station parameter group 1 (optional) | Another parameter in the returned station parameter group 1 (optional) | ... |

| ... | Station AID in a returned station parameter group S | Security key in the returned station parameter group S (optional) | Security key in the returned station parameter group S (optional) | Extension field (optional) |

FIG. 18b

COMMUNICATIONS METHOD AND DEVICE HAVING VIRTUAL ACCESS POINT

CROSS-REFERENCE TO RELATED APPLICATIONS

This application is a continuation of International Application No. PCT/CN2018/117301, filed on Nov. 23, 2018, which claims priority to Chinese Patent Application No. 201711307035.X, filed on Dec. 11, 2017. The disclosures of the aforementioned applications are hereby incorporated by reference in their entireties.

TECHNICAL FIELD

The embodiments relate to the field of wireless communications technologies, and to a communications method and device.

BACKGROUND

In communication performed by using a high frequency band, a narrow radiation beam with a high antenna gain needs to be used to overcome a disadvantage of a high path loss in millimeter wave transmission, and this is a so-called beamforming (beam forming) technology. In the beamforming technology, a transmit-end device needs to determine, based on beam feedback information provided by a receive-end device, a beam parameter and a transmit antenna with best quality when the transmit-end device transmits data to the receive-end device.

A wireless fidelity (Wi-Fi) system that uses a high frequency band for communication is used as an example. In the Wi-Fi system, if a station (STA) moves or changes a direction, an access point (AP) that provides a communication service for the station may change, and this process generally includes: The station is associated with an access point A before moving, in other words, the access point A provides a communication service for the station; after the station moves or changes a direction, if the station finds, by searching for an access point, that a better effect is achieved if an access point B provides a communication service for the station, the station switches from being associated with the access point A to being associated with the access point B, and after the switching, the access point B provides the communication service for the station. In this process, when the station searches for the access point and switches between the access points, a service of the station is interrupted within a period of time. In addition, the station needs to exchange signaling when switching between the access points, and consequently, there are specific signaling overheads.

In conclusion, in an existing system that uses a high frequency band for communication, a location change or a direction change of a station causes a change in an access point that provides a communication service for the station. In this process, there are specific service interruption time and signaling overheads.

SUMMARY

Embodiments provide a communications method and device, to reduce service interruption time and signaling overheads that are generated when an access point that provides a communication service for a station changes because the station moves or changes a direction.

According to a first aspect, an embodiment provides a communication method. The method may be applied to a communications system that includes an access point set including a plurality of access points. The access point set includes a control access point and a member access point. The method includes the following steps.

An access point in the access point set sends a first frame to a station, where the first frame includes a sending address and an antenna identifier, and an antenna corresponding to the antenna identifier is used when the access point sends the first frame.

First frames sent by different access points in the access point set include the same sending address, and the sending address includes an identifier of the control access point or an identifier of the access point set.

In this method, the first frames sent by the different access points in the access point set to the station include the same sending address, and the access point set may be considered as one access point. In this way, when the station moves or changes a direction, an access point that provides a communication service for the station changes from one access point in the access point set to another access point. Because first frames sent by access points in the access point set include a same sending address, the station cannot perceive a change even if the station communicates with different access points before and after the station moves or changes the direction, and the station also considers the access point set as one access point. In this way, the station does not need to perform an access point switching process, thereby avoiding station service interruption and signaling overheads that are caused by the access point switching process.

In a possible design, the first frame may be at least one of the following types of frames: a medium access control (MAC) frame, a physical layer (PHY) frame, and the like. For example, the MAC frame includes at least one of the following: a beacon frame, a management frame, a data frame, a control frame, and the like. This is not limited in the embodiments.

According to this design, in the communications system, MAC frames or PHY frames sent by different access points in the access point set to the station include a same sending address, so that when receiving the MAC frame or the PHY frame sent by the access point in the access point set, the station may consider the access point set as one access point.

When the access point is the control access point in the access point set, the method further includes the following designs:

In a possible design, the control access point allocates a first parameter to the access point in the access point set, and sends the first parameter to the member access point. The first parameter includes at least one of the following: the identifier of the control access point, an identifier of the member access point, a first set, and a second set. The first set includes at least one antenna identifier of the access point, the second set includes at least one station identifier, and the at least one station identifier is allocated by the access point to the station.

According to this design, the control access point may control and manage each access point in the access point set.

In a possible design, an antenna identifier corresponding to each antenna of each access point in the access point set is unique in the access point set. In other words, there is no same antenna identifier between at least one antenna identifier corresponding to at least one antenna of any access point in the access point set and an antenna identifier corresponding to at least one antenna of another access point in the access point set. In other words, there is no intersection set in first sets allocated to different access points.

In a possible design, the first parameter further includes a third set. The third set includes at least one security key, and the at least one security key is allocated by the access point to the station.

According to this design, the control access point may further control and manage a security key of each access point in the access point set.

In a possible design, the control access point may send, to the member access point, a second frame that carries the first parameter. In this way, it can be ensured that the control access point successfully sends the first parameter to the member access point.

In a possible design, before the control access point sends the first parameter to the member access point, the control access point receives a parameter request frame sent by the member access point, where the parameter request frame is used to request to obtain the first parameter.

According to this design, the control access point may allocate the first parameter to the member access point when the member access point requests allocation of the first parameter.

In a possible design, the parameter request frame includes a first association request frame, and the first association request frame instructs the member access point to request to associate with the control access point.

According to this design, the control access point may allocate the first parameter to the member access point when the member access point requests to associate with the control access point.

In a possible design, the parameter request frame further includes a quantity of antennas supported by the member access point.

According to this design, the control access point may allocate the first set including the at least one antenna identifier to the member access point based on the quantity of antennas supported by the member access point. A quantity of antenna identifiers included in the first set allocated to the member access point is less than or equal to the quantity of antennas supported by the member access point.

In a possible design, the control access point receives a third frame sent by the member access point, where the third frame includes a station identifier that belongs to the second set.

According to this design, the control access point may recycle and reuse the station identifier.

In a possible design, the control access point receives a fourth frame sent by the member access point, where the fourth frame includes a security key that belongs to the third set.

According to this design, the control access point may recycle and reuse the security key.

In a possible design, a value range of the identifier of the member access point includes an association identifier (AID) that belongs to [1, 254], and/or an AID that is greater than 255; and/or a value range of the identifier of the control access point includes at least one of the following: an AID that is equal to 0, an AID that belongs to [1, 254], and an AID that is greater than 255; and/or a value range of the station identifier includes an AID that belongs to [1, 254], and/or an AID that is greater than 255, where the AID is an integer.

In a possible design, if at least one access point in the access point set receives a service request frame sent by the station, where the service request frame is used by the station to request the access point set to provide a communication service, the control access point determines a target access point from the at least one access point in the access point set; and when the determined target access point is the control access point, the control access point provides the communication service for the station; or when the determined target access point is the member access point in the access point set, the control access point sends instruction information to the member access point, where the instruction information is used to instruct the member access point to provide the communication service for the station.

In this method, the control access point may control and manage an access point that provides a service for the station.

When a type of the access point is not limited, in other words, the access point may be the control access point or the member access point, the method further includes the following designs:

In a possible design, the identifier of the access point set is the AID that is equal to 0.

In a possible design, the access point receives the service request frame sent by the station; and the access point provides a communication service for the station.

In this method, the access point in the access point set may provide the communication service for the station after receiving the service request frame of the station.

In a possible design, when the service request frame includes a specified antenna identifier used by an access point that can provide a communication service for the station; and before the access point provides the communication service for the station, the access point further needs to determine that the at least one antenna identifier of the access point includes the specified antenna identifier.

In this method, the station may send a selected specified antenna identifier with good signal quality to an access point in the access point set, so that an access point that includes an antenna corresponding to the specified antenna identifier can use the antenna to provide a communication service for the station, thereby ensuring signal transmission quality of the station.

In a possible design, the access point receives a second parameter of the station that is sent by an original access point of the station, where the original access point is a previous access point that is in the access point set and that provides a communication service for the station; and the access point provides the communication service for the station.

In this method, the access point can replace the original access point, and successfully provides the communication service for the station by using the second parameter.

In a possible design, the second parameter includes at least one of the following: a station identifier of the station and a security key of the station.

In this way, the access point can provide the communication service for the station by using a necessary parameter that can be used by the station to communicate with the access point set.

In a possible design, the access point may receive, in the following two manners, the second parameter sent by the original access point:

In a first manner, the access point receives, by using the control access point, the second parameter sent by the original access point.

In a second manner, the access point directly receives the second parameter from the original access point.

According to this design, the access point can successfully obtain the second parameter of the station.

In a possible design, before the access point provides the communication service for the station, the method further includes: sending a service response frame to the station, where the service response frame is used to instruct the access point to provide the communication service for the station.

According to this design, the access point may notify, by using the service response frame, the station that the access point provides a service for the station.

When the access point is the member access point in the access point set, the method further includes the following designs:

In a possible design, the member access point receives the first parameter sent by the control access point in the access point set.

In a possible design, the member access point receives the second frame that is sent by the control access point and that carries the first parameter.

In a possible design, before receiving the second frame that is sent by the control access point and that carries the first parameter, the member access point sends a parameter request frame to the control access point, where the parameter request frame is used to request to obtain the first parameter.

In a possible design, before sending the parameter request frame to the control access point, the member access point receives a second association request frame sent by the station. The second association request frame is used by the station to request to associate with the access point set.

According to this design, after receiving the second association request frame sent by the station, the member access point may send the parameter request frame to the control access point, to request the control access point to allocate a station parameter to the member access point, so that the member access point can allocate the station parameter to the station.

In a possible design, the member access point sends a third frame to the control access point. The third frame includes a station identifier that belongs to the second set.

In a possible design, the member access point sends a fourth frame to the control access point. The fourth frame includes a security key that belongs to the third set.

According to a second aspect, an embodiment further provides a communication method. The method may be applied to a communications system that includes an access point set including a plurality of access points. The access point set includes a control access point and a member access point. The method includes the following steps.

A station receives at least one first frame sent by an access point in the access point set, where the first frame includes a sending address and an antenna identifier, and an antenna corresponding to the antenna identifier is used when the access point sends the first frame. Then, the station sends a service request frame to the access point, where the service request frame includes a specified antenna identifier used by the access point that can provide a communication service for the station, and the specified antenna identifier is an antenna identifier included in a first frame that is in the at least one first frame and that meets a preset condition. First frames sent by different access points in the access point set include the same sending address, and the sending address includes an identifier of the control access point or an identifier of the access point set.

In this method, the station may send the first frame by using the access point in the access point set, to implement beam training. For example, the station may select an antenna with relatively high transmission quality from a plurality of antennas used when the access point sends the first frame, to ensure that the antenna with relatively high transmission quality selected by the station can be used when the access point subsequently provides a service for the station, thereby ensuring signal transmission efficiency between the station and the access point.

In a possible design, the access point may send the first frame (namely, a beacon frame) in different sector directions within a beacon transmission interval (BTI) of a beacon period of the access point. Correspondingly, the service request frame is a sector sweep frame that is sent by the station in an association beamforming training (A-BFT) interval of the access point. Optionally, in this embodiment, the access point may use, in the A-BFT interval of the access point, one receive antenna or a plurality of receive antennas to receive the sector sweep frame sent by the station.

According to this design, the access point can implement beam training within the BTI of the access point.

In a possible design, at least one access point in the access point set may send the first frame (a frame that is similar to the beacon frame or the sector sweep frame and that is used for beam training) in different sector directions outside the BTI of the access point, for example, in a time period in which a service of the station is idle or a time period in which beam training needs to be performed. Correspondingly, the service request frame is a frame that is similar to the sector sweep frame and that is used for beam training.

According to this design, the access point in the access point set may perform beam training with the station in advance without affecting the service of the station. In this way, when the station meets a condition of switching an access point that provides a communication service for the station, another access point that has finished beam training may quickly replace an original access point, and continue to provide the communication service for the access point.

In a possible design, the first frame that is in the at least one first frame and that meets the preset condition includes:
 a first frame that is in the at least one first frame and whose signal quality is greater than or equal to a preset threshold, and/or a first frame with best signal quality in the at least one first frame.

According to this design, the station may select an antenna with relatively high transmission quality from a plurality of antennas used when the access point sends the first frame, to ensure that the antenna with relatively high transmission quality selected by the station can be used when the access point subsequently provides a service for the station, thereby ensuring signal transmission efficiency between the station and the access point.

In a possible design, the station sends a second association request frame, where the second association request frame is used by the station to request to associate with the access point set, and then, the station receives a third parameter sent by an access point in the access point set, where the third parameter includes a station identifier allocated to the station.

According to this design, the station may associate with the access point set by sending the second association request frame, and obtain, from the access point set, a parameter (the third parameter) necessary for communicating with the access point set.

In a possible design, a value range of the station identifier includes an association identifier (AID) that belongs to [1, 254], and/or an AID that is greater than 255, where the AID is an integer.

In a possible design, the third parameter further includes a security key allocated to the station.

In a possible design, the station receives a service response frame sent by the access point in the access point set, where the service response frame is used to instruct the access point to provide a communication service for the station.

According to this design, the station may determine, by using the service response frame sent by the access point, an access point that is to provide a communication service to the station.

According to a third aspect, an embodiment provides an access point, including: a unit or a module configured to perform the steps in the first aspect.

According to a fourth aspect, an embodiment provides a station, including: a unit or a module configured to perform the steps in the second aspect.

According to a fifth aspect, an embodiment provides an access point, including a transceiver, a processor, and a memory. The processor is configured to: invoke and execute a computer program stored in the memory, and send and receive data by using the transceiver to implement the method provided in the first aspect.

According to a sixth aspect, an embodiment provides a station, including a transceiver, a processor, and a memory. The processor is configured to: invoke and execute a computer program stored in the memory, and send and receive data by using the transceiver to implement the method provided in the second aspect.

According to a seventh aspect, an embodiment provides a communications device, including at least one processing element (or chip) configured to perform the method in any one of the foregoing aspects.

According to an eighth aspect, an embodiment provides a program. When being executed by a processor, the program is used to perform the method in any one of the foregoing aspects.

According to a ninth aspect, an embodiment provides a program product, such as a computer readable storage medium. The program product stores a program including the program in the eighth aspect.

According to a tenth aspect, an embodiment provides a chip. The chip is configured to read and execute a computer program stored in a memory, to implement the method in any one of the foregoing aspects.

According to an eleventh aspect, an embodiment provides a chip system. The chip system includes a processor, configured to support an access point or a station to implement functions in the foregoing corresponding aspects. In a possible design, the chip system further includes a memory, and the memory is configured to store a program instruction and data that are necessary to a device. The chip system may include a chip, or include a chip and another discrete device.

According to a twelfth aspect, an embodiment provides a communications system. The communications system includes an access point and a station that are configured to implement the foregoing corresponding aspects.

In the solution provided in the embodiments, the access point set includes the control access point and the member access point, the first frames sent by the different access points in the access point set to the station include the same sending address, and the sending address may include the identifier of the control access point in the access point set or the identifier of the access point set. According to this solution, when the station moves or changes a direction, an access point that provides a communication service for the station changes from one access point in the access point set to another access point. Because first frames sent by access points in the access point set include a same sending address, the station may consider the access point set as one access point. In this way, the station does not need to perform an access point switching process, thereby avoiding station service interruption and signaling overheads that are caused by the access point switching process.

BRIEF DESCRIPTION OF DRAWINGS

FIG. 4a is a structural diagram of a second frame according to an embodiment;

FIG. 4b is a structural diagram of a second frame according to an embodiment;

FIG. 5 is a structural diagram of a parameter request frame according to an embodiment;

FIG. 6a is a structural diagram of a second frame according to an embodiment;

FIG. 6b is a structural diagram of a second frame according to an embodiment;

FIG. 6c is a structural diagram of a second frame according to an embodiment;

FIG. 6d is a structural diagram of a second frame according to an embodiment;

FIG. 7a is a structural diagram of a parameter request frame according to an embodiment;

FIG. 7b is a structural diagram of a parameter request frame according to an embodiment;

FIG. 8a is a structural diagram of a second frame according to an embodiment;

FIG. 8b is a structural diagram of a second frame according to an embodiment;

FIG. 8c is a structural diagram of a second frame according to an embodiment;

FIG. 8d is a structural diagram of a second frame according to an embodiment;

FIG. 8e is a structural diagram of a second frame according to an embodiment;

FIG. 9a is a structural diagram of a second frame according to an embodiment;

FIG. 9b is a structural diagram of a second frame according to an embodiment;

FIG. 9c is a structural diagram of a second frame according to an embodiment;

FIG. 9d is a structural diagram of a second frame according to an embodiment;

FIG. 10a is a structural diagram of a second frame according to an embodiment;

FIG. 10b is a structural diagram of a second frame according to an embodiment;

FIG. 11a is a structural diagrams of a parameter request frame according to an embodiment;

FIG. 11b is a structural diagrams of a parameter request frame according to an embodiment;

FIG. 11c is a structural diagrams of a parameter request frame according to an embodiment;

FIG. 12a is a structural diagram of a second frame according to an embodiment;

FIG. 12c is a structural diagram of a second frame according to an embodiment;

FIG. 12e is a structural diagram of a second frame according to an embodiment;

FIG. 17a is a structural diagram of a fifth frame according to an embodiment;

FIG. 17b is a structural diagram of a fifth frame according to an embodiment;

FIG. 18a is a structural diagram of a sixth frame according to an embodiment;

FIG. 18b is a structural diagram of a sixth frame according to an embodiment;

DESCRIPTION OF EMBODIMENTS

Figure 1:
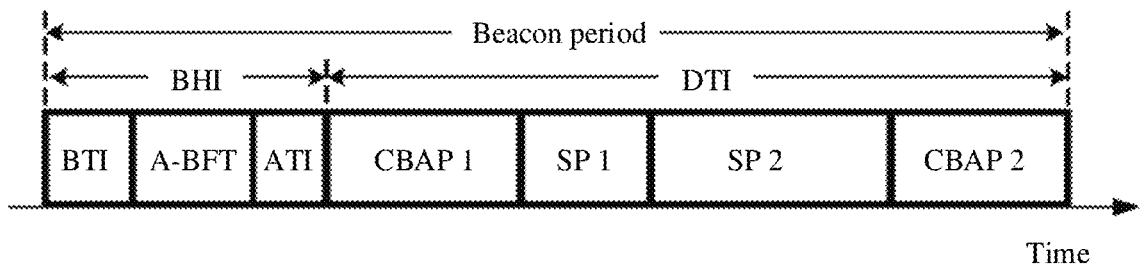
FIG. 1 is a schematic structural diagram of a beacon period according to an embodiment.

The embodiments described herein provide a communications method and device, to reduce service interruption time and signaling overheads that are generated when an access point that provides a communication service for a station changes because the station moves or changes a direction. The method and the device are based on a same inventive concept. Because a problem-resolving principle of the method is similar to that of the device, for implementation of the method and the device, refer to each other. No repeated description is provided.

In the embodiments, an access point set includes a control access point and a member access point, first frames sent by different access points in the access point set to a station include a same sending address, and the sending address may include an identifier of the control access point in the access point set or an identifier of the access point set. According to this solution, when the station moves or changes a direction, an access point that provides a communication service for the station changes from one access point in the access point set to another access point. Because first frames sent by access points in the access point set include a same sending address, the station may consider the access point set as one access point. In this way, the station does not need to perform an access point switching process, thereby avoiding station service interruption and signaling overheads that are caused by the access point switching process.

In the following, some terms are described, to help a person skilled in the art have a better understanding.

(1) A station is a device that has a wireless connection function and that can provide voice and/or data connectivity for a user, and may also be referred to as a terminal device, user equipment (UE), a mobile station (MS), a mobile terminal (MT), or the like. Currently, some examples of the station include a mobile phone (mobile phone), a tablet computer, a notebook computer, a palmtop computer, a mobile Internet device (MID), a wearable device, a virtual reality (VR) device, an augmented reality (AR) device, a wireless terminal in industrial control (industrial control), a wireless terminal in self-driving (self driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), an in-vehicle device, and the like.

(2) An access point is a device that enables a station to access a radio network in a communications system, and may also be referred to as a radio access network (RAN) node (or device), a base station, or the like. Currently, some examples of the access point are a gNB, a transmission reception point (TRP), an evolved NodeB (eNB), a radio network controller (radio network controller, RNC), a NodeB (NB), a base station controller (BSC), a base transceiver station (BTS), a home eNodeB (HNB), a baseband unit (BBU), a Wi-Fi access point, or an AP controller (AC), and another interface device that can work in a wireless environment.

In addition, in a network structure, the access point may include a centralized unit (CU) node and a distributed unit (DU) node. This structure splits protocol layers of an eNB in a long term evolution (LTE) system. Functions of some protocol layers are centrally controlled by a CU, and functions of some or all of remaining protocol layers are distributed in DUs, and the DUs are centrally controlled by the CU.

(3) An access point set includes a plurality of access points. The plurality of access points include two types: a control access point and a member access point. There is at least one control access point, and another access point in the access point set except the control access point is the member access point.

The control access point not only has a communication function of the member access point, but also has a function of controlling and managing all access points (the member access point and the control access point) in the access point set. For example, the control access point allocates an identifier to each access point, or allocates at least one antenna identifier to each access point, or allocates at least one station identifier to each access point (the at least one station identifier is allocated by the access point to a station for which the access point provides a communications service), or instructs the member access point to provide a communication service for the station. Instructions include an explicit instruction and/or an implicit instruction.

The member access point has a conventional communication function and is controlled and managed by the control access point.

It should be noted that, first frames sent by access points (including the control access point and the member access point) in the access point set to the station include a same sending address (in other words, the access point set is used as a virtual access point). In this way, the station may consider the access point set as one access point. Therefore, the station is within a coverage area of the access point set, and even if an access point that provides a communication service for the station changes, the station does not need to perform an access point switching process.

It may be learned from the foregoing descriptions that, the access point set may be used as one virtual access point, and each access point in the access point set may be used as at least one antenna of the virtual access point (a quantity of antennas is a quantity of antennas included in the access point). Therefore, optionally, an antenna identifier corresponding to each antenna of each access point in the access point set is unique in the access point set. In other words, there is no same antenna identifier between at least one antenna identifier corresponding to at least one antenna of any access point in the access point set and an antenna identifier corresponding to at least one antenna of another access point in the access point set.

(4) A first parameter includes various parameters allocated by the control access point in the access point set to the access points (including the control access point and the member access point) in the access point set. Optionally, the first parameter may include at least one of the following: an identifier of the control access point, an identifier of the member access point, a first set of any access point, and a second set of any access point. The first set of any access point includes at least one antenna identifier of the access point, the second set of any access point includes at least one station identifier, and the at least one station identifier is allocated by the access point to the station.

Optionally, the first parameter may further include a third set of any access point. The third set of any access point includes at least one security key, and the at least one security key is allocated by the access point to the station.

(5) A third parameter is a necessary parameter that can be used by the station to perform communication in the access point set, and the third parameter is allocated and sent to the station by an access point that is in the access point set and that receives a second association request frame of the station. The third parameter includes a station identifier allocated to the station. Optionally, the third parameter further includes a security key allocated to the station.

(6) A second parameter is sent by an original access point to a target access point when an access point that provides a communication service for the station changes within a coverage area of the access point set, so that the target access point can provide the communication service for the station by using the second parameter. Optionally, the second parameter may include at least one of the following: the station identifier of the station and the security key of the station.

Optionally, when the second parameter includes a part of the foregoing content, the other part of the content may be obtained by the target access point from the station or from the control access point in the access point set. This is not limited in the embodiments.

(7) The original access point is an access point that provides a communication service for the station before the access point that provides a communication service for the station changes.

(8) The target access point is an access point that is in the access point set and that is currently providing a communication service for the station or that is to provide a communication service for the station.

(9) The identifier of the access point set is an association identifier (association identifier, AID) that is equal to 0.

(10) A value range of the identifier of the member access point includes an association identifier AID that belongs to [1, 254], and/or an AID that is greater than 255.

(11) A value range of the identifier of the control access point includes at least one of the following: an AID that is equal to 0, an AID that belongs to [1, 254], and an AID that is greater than 255.

(12) A value range of the station identifier includes an AID that belongs to [1, 254], and/or an AID that is greater than 255.

It should be noted that the AID is an integer.

(13) A beacon period is a period that is synchronously set by the station and the access point in the communications system and that is used for communication scheduling of devices in the communications system. One beacon period is divided into a plurality of access time periods, and the time periods have different objectives and access mechanisms.

In the following, the access time period in the beacon period is briefly described by using a beacon period in a Wi-Fi system in the 802.11ad standard as an example. As shown in a schematic structural diagram of a beacon period shown in FIG. 1, the beacon period includes a beacon header interval (BHI) and a data transfer interval (DTI).

The BHI includes the following three intervals: a beacon transmission interval (BTI), an association-beamforming training (A-BFT) interval, and an announcement transmission interval (ATI).

In the BTI, the access point may broadcast one or more beacon frames. The access point may send these beacon frames in different sector directions, and each beacon frame carries an antenna identifier (ID) and a sector identifier that are used when the access point sends the beacon frame. The 802.11ad standard specifies that the access point cannot replace, in one BTI, an antenna used for sending the beacon frame.

An A-BFT process is implemented within the A-BFT interval. The A-BFT process includes a beam direction training process and a beam feedback process. In the A-BFT process, the station may sweep transmit beam sectors and antennas in different directions, and the access point omnidirectionally receives beam sectors and antennas; or the station sends a beam sector and an antenna in a fixed direction, and the access point sweeps beam sectors and antennas in different directions.

One A-BFT process includes one or more sector sweep time slots (SSW Slot). A length of one SSW slot is an SSW slot time. In each A-BFT process, the station randomly selects one SSW slot to send a sector sweep frame (SSW Frame), and a station in each SSW slot may send at least one SSW frame to the access point. A quantity of SSW frames sent by a station in one SSW slot cannot exceed an indication of the access point, and the access point indicates, by using a beacon frame, a quantity of SSW frames that the station is allowed to send to the access point in one SSW slot. If not all the SSW frames that need to be sent by the station can be sent in one SSW slot, the station can continue to send the SSW frame in a next SSW slot. In one SSW slot, after the station sends one or more SSW frames, the access point replies with a section sweep feedback frame (SSW-Feedback Frame) to the station based on a detected SSW frame result. The access point replies with the SSW feedback frame at the end of an SSW slot, and time required by the access point to reply with the SSW feedback frame needs to ensure that the station can send a maximum quantity of SSW frames.

The DTI includes any quantity of service periods (SP) in any sequence and a contention-based access period (CBAP).

Any SP is an access time period allocated to a specified pair of stations. In this time period, only this pair of stations are allowed to perform communication, and another station cannot preempt channels.

Any CBAP is an access time period allocated to all stations (specified plurality of stations). In this time period, the station needs to perform access by contending for a channel.

(14) The first frame is various frames sent by the access points in the access point set to the station. Optionally, the first frame may include at least one of the following types of frames: a medium access control (MAC) frame, a physical (PHY) frame, and the like.

The MAC frame includes at least one of the following: a beacon frame, a management frame, a data frame, a control frame, and the like. This is not limited in the embodiments.

It should be noted that first frames sent by different access points in the access point set include a same sending address. Optionally, the first frames sent by the different access points include different antenna identifiers. Further, first frames sent by a same access point by using different antennas also include different antenna identifiers.

(15) The second frame is sent by the control access point in the access point set to the member access point, where the second frame carries a first parameter allocated by the control access point to the access point in the access point set. Optionally, the second frame may include at least one of the following: an announcement frame, an association feedback frame, an information feedback frame, an access point set management frame, and the like. This is not limited to the embodiments.

Optionally, when the second frame is sent through multicasting or broadcasting, the second frame carries first parameters allocated to a plurality of member access points.

Optionally, when the second frame includes an identifier of a member access point serving as a receive end (in other words, the second frame is sent in a one-to-one manner), the second frame carries a first parameter allocated to the member access point.

(16) The third frame is that when the station moves out of the coverage area of the access point set, a last member access point that serves the station returns, to the control access point in the access point set, a station identifier allocated to the station, so that the control access point can recycle and reuse the station identifier.

The station identifier is sent to the station by an access point that is in the access point set and that receives a second association request frame sent by the station, and the station identifier does not change if the station is within the coverage area of the access point set.

(17) The fourth frame is that when the station moves out of the coverage area of the access point set, a last member access point that serves the station returns, to the control access point in the access point set, a security key used by the station, so that the control access point can recycle and reuse the security key used by the station.

The security key used by the station is sent to the station by an access point that is in the access point set and that receives a second association request frame sent by the station, and the security key used by the station does not change if the station is within the coverage area of the access point set.

In addition, it should be further noted that the third frame and the fourth frame may be a same frame, or may be different frames. This is not limited to the embodiments.

(18) The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

In the embodiments, "a plurality of" means two or more than two.

In addition, it should be understood that in the descriptions of the embodiments, words "first", "second", and the like are merely used for distinctive description, and shall not be understood as an indication or implication of relative importance or an indication or implication of an order.

The following further illustrates the embodiments in detail with reference to the accompanying drawings of this specification.

Figure 2A:
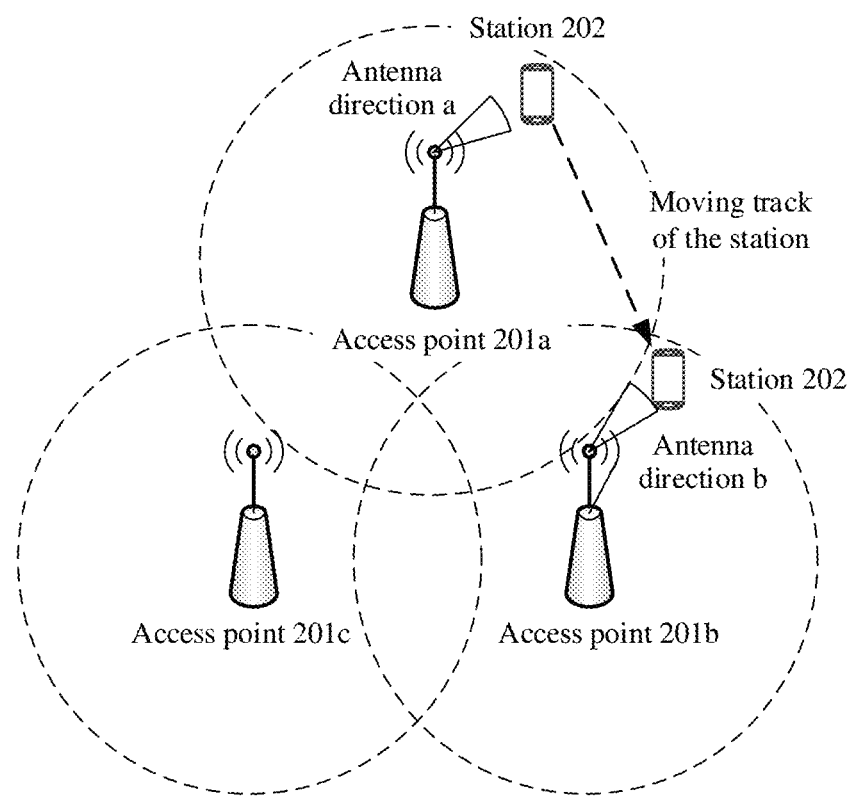
FIG. 2a is an architectural diagram of a communications system according to an embodiment.

As shown in FIG. 2a, a conventional communications system includes an access point 201 (an access point 201a, an access point 201b, and an access point 201c shown in the figure) and a station 202. A coverage area of each access point 201 is shown in the figure.

As shown in the figure, after the station 202 enters a coverage area of the access point 201a, the station 202 requests to associate with the access point 201a. After association succeeds, the access point 201a provides a communication service for the station 202, and performs access management on the station 202 by using a beacon period.

It may be learned from the foregoing descriptions of the beacon period that the station 201 may use a corresponding access mechanism in each access time period of the beacon period. For details, refer to the foregoing descriptions. Details are not described herein again.

It should be noted that both the station 202 and the access point 201 in the communications system perform communication by using an antenna. In a BTI of any access point, the access point 201 may send a beacon frame through sector sweeping, in other words, the access point 201 may send the beacon frame in different antenna directions. In an A-BFT interval of any access point 201, a station near the access point 201 sends a sector sweep frame in a different antenna direction.

When the station 202 moves from the coverage area of the access point 201a to the coverage area of the access point 201b along a moving track shown in the figure, quality of a signal transmitted between the station 202 and the access point 201a deteriorates because the station 202 is relatively far away from the access point 201a. In this case, the station 202 searches for an access point on different frequency bands. When the station 202 detects a beacon frame from the access point 201b, and determines that signal quality of the beacon frame is relatively good, the station 202 starts to perform an access point switching process (which may also be referred to as an access point (re)association process). In the access point switching process, the station 202 needs to perform an authentication procedure and an association procedure. Finally, the access point 201b provides a communication service for the station 202.

In this process, when the station 202 searches for the access point and switches between the access points, a service of the station is interrupted with for a period of time. In addition, the station needs to exchange signaling when switching between the access points, and consequently, there are specific signaling overheads.

It may be learned from the foregoing descriptions that, if a conventional communication method is used in the communications system shown in FIG. 2a, when the station 202 moves or changes a direction, the station 202 may search for a better access point 201 by using the access point, to perform an access point switching process, thereby causing service interruption of the station and increasing signaling overheads of the communications system.

Figure 2B:
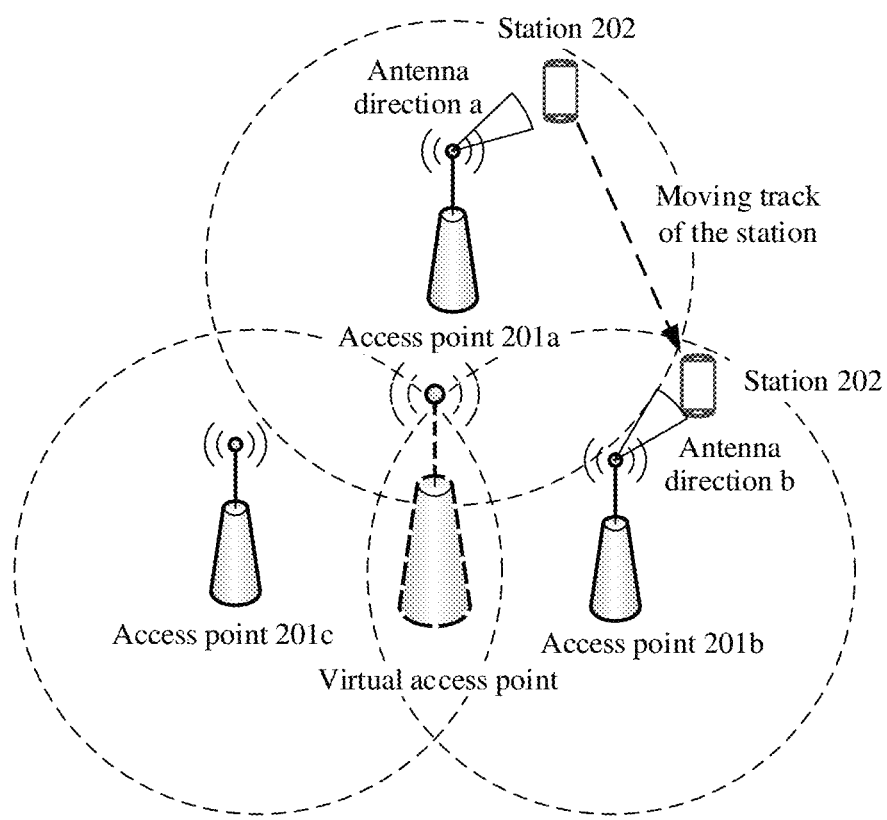
FIG. 2b is an architectural diagram of a communications system according to an embodiment.

To resolve the foregoing problem, in this embodiment, a plurality of access points 201 (the access point 201a, the access point 201b, and the access point 201c shown in the figure) in the communications system shown in FIG. 2a may form an access point set, as shown in FIG. 2b. The access point set includes at least one control access point and a member access point. For example, the access point 201c in the figure is the control access point, and the access point 201a and the access point 201b are member access points.

The access point 201a and the access point 201b have a conventional communication function.

The access point 201c not only has a communication function of the member access point, but also has a function of controlling and managing all access points in the access point set.

In the communications system shown in FIG. 2b, first frames sent by different access points 201 in the access point set to the station 202 include a same sending address. Therefore, the access point set including the access point 201a, the access point 201b, and the access point 201c may be considered as one virtual access point, as shown by an access point drawn by using dotted lines in FIG. 2b.

Therefore, when the station 202 moves or changes a direction, an access point 201 that provides a communication service for the station 202 changes from the access point 201a to the access point 201b. Because first frames sent by access points 201 in the access point set to the station 202 include a same sending address, the station 202 may also consider the access point set as one virtual access point. In this way, the station 202 does not need to perform an access point switching process, thereby avoiding station service interruption and signaling overheads that are caused by the access point switching process.

It should be noted that the communications system shown in FIG. 2b does not constitute a limitation on the communications system to which the embodiments are applicable. Therefore, the method provided in the embodiments is applicable to various communications systems that use high frequency bands for communication, for example, a Wi-Fi system, a fifth generation (5th generation, 5G) communications system, a next-generation 60 gigahertz (GHz) system, or various future mobile communications systems. This is not limited to the embodiments. Optionally, the communications system may use a PCP/AP clustering technology in the 802.11ad standard (for example, a non-centrally controlled PCP/AP clustering manner or a centrally controlled PCP/AP clustering manner) to improve a spatial multiplexing rate and mitigate interference. Optionally, the communications system may further support a technology in the 802.11ay standard. This is not limited in the embodiments.

Figure 3:
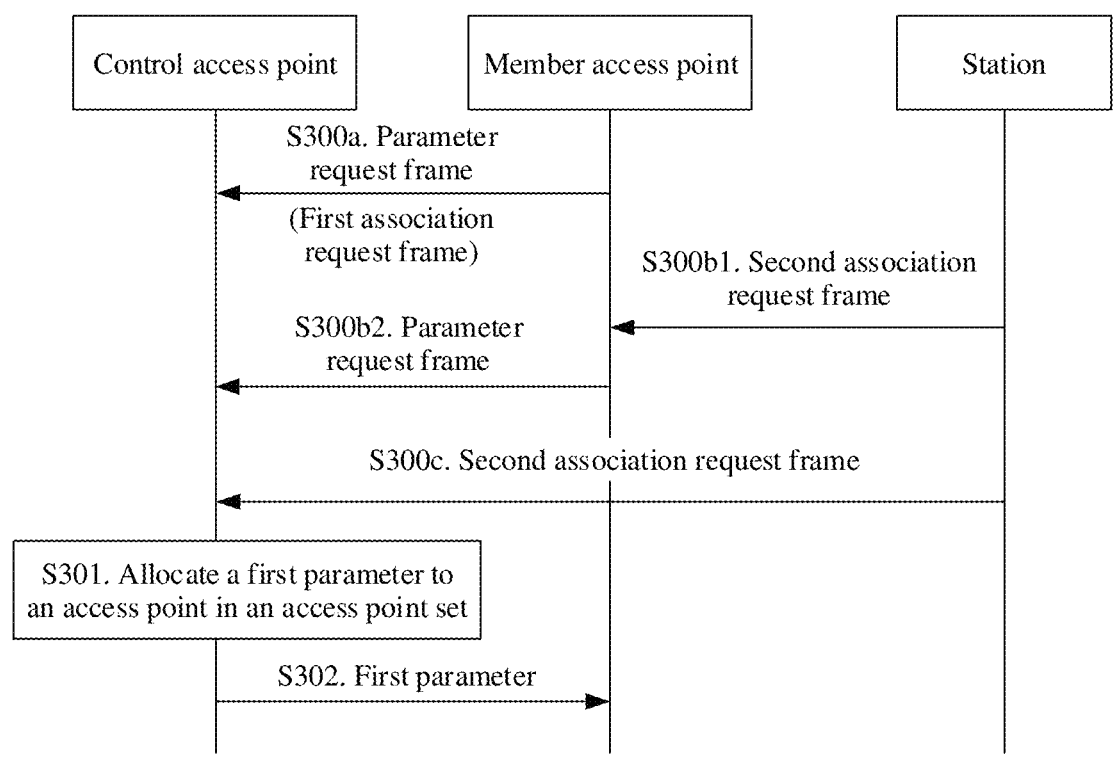
FIG. 3 is a flowchart of a communication method according to an embodiment.

An embodiment provides a communication method. The method is applicable to the communications system shown in FIG. 2b. The method is used by a control access point in an access point set to control and manage all access points (including the control access point and a member access point) in the access point set. As shown in FIG. 3, a process of the method includes the following steps.

In step 301 (S301), the control access point allocates a first parameter to an access point in the access point set.

The first parameter includes at least one of the following: an identifier of the control access point, an identifier of the member access point, a first set, and a second set.

The first set includes at least one antenna identifier of the access point, the second set includes at least one station identifier, and the at least one station identifier is allocated by the access point to the station.

In S301, the control access point may allocate a corresponding first parameter to each access point in the access point set at a time, or allocate corresponding first parameters to only some member access points (for example, a member access point that requests the control access point to allocate a parameter) in the access point set at a time, or allocate a corresponding first parameter to the control access point.

It may be learned from the foregoing descriptions that a first parameter allocated to any access point includes an identifier of the access point, a first set, and a second set. The first set allocated to the access point includes at least one antenna identifier, the second set allocated to the access point includes at least one station identifier, and the at least one station identifier is allocated by the access point to the station.

Optionally, the first parameter allocated to any access point may further include a third set. The third set includes at least one security key, and the at least one security key is allocated by the access point to the station.

By using S301, the control access point may allocate corresponding first parameters to some or all access points in the access point set. In this way, when the first parameter includes the identifier of the access point, all other access points in the access point set may communicate with the access point by using the identifier of the access point.

When the first parameter includes the first set allocated to the access point, when subsequently sending communication to the station or another access point, the access point may add an antenna identifier in the first set to a frame sent through communication, to indicate an antenna used when the access point sends the frame.

When the first parameter includes the second set allocated to the access point, when the access point receives a second association request frame sent by the station, the access point may allocate a station identifier in the second set to the station, so that in a process in which the station is within a coverage area of the access point set, the station always communicates with the access point in the access point set by using the allocated station identifier.

When the first parameter includes the third set allocated to the access point, when the access point receives a second association request frame sent by the station, the access point may allocate a security key in the third set to the station, so that in a process in which the station is within a coverage area of the access point set, the station always communicates with the access point in the access point set by using the allocated security key.

In step 302 (S302), the control access point sends the first parameter to the member access point.

Optionally, in an implementation, when performing S302, the control access point may send a first parameter corresponding to each member access point to the corresponding member access point.

Optionally, in another implementation, when performing S302, the control access point may also send, to all member access points in the access point set, first parameters that correspond to all the access points and that are allocated this time.

Optionally, the control access point may perform S301 and S302 in the following scenarios, but is not limited to the following scenarios:

Scenario 1: The control access point may periodically perform the foregoing steps. In each period, before performing S301, the control access point counts each parameter resource (for example, an identifier resource of the access point, an antenna identifier resource, a station identifier resource, or a security key resource) that is not allocated to the access point, and determines that an access point to which a corresponding first parameter (including an access point that requests, in the current period, the control access point to allocate a parameter) is not previously allocated, to allocate, based on each parameter resource that is not allocated to the access point, the corresponding first parameter to the access point to which the corresponding first parameter is not previously allocated.

Scenario 2: The control access point may allocate a corresponding first parameter to each access point in the access point set when creating the access point set or when initializing a parameter of each access point in the access point set.

Scenario 3: The member access point in the access point set actively requests parameter allocation.

In the scenario 3, as shown in FIG. 3, before S301, the method further includes the following steps.

At step 300a (S300a), at least one member access point in the access point set sends a parameter request frame to the control access point, where the parameter request frame is used to request to obtain the first parameter. Correspondingly, the control access point receives the parameter request frame sent by the member access point, where the parameter request frame is used to request to obtain the first parameter.

It should be noted that any member access point may send the parameter request frame to the control access point in the following cases, but is not limited to the following cases:

In a first case, all station identifiers in the second set in the first parameter allocated to the member access point are allocated to the station.

In a second case, all security keys in the third set in the first parameter allocated to the member access point are allocated to the station.

In a third case, the member access point is a member access point that is newly added to the access point set and that has not been associated with the control access point.

In the third case, the parameter request frame sent by the member access point may be a first association request frame, and the first association request frame indicates that the member access point requests to associate with the control access point.

Scenario 4: The member access point in the access point set is triggered by the station to request parameter allocation.

In the scenario 4, as shown in FIG. 3, before S301, the method further includes the following steps.

At step S300b1 (S300b1), after entering a coverage area of the access point set, the station sends a second association request frame to the access point set, where the second association request frame is used by the station to request to associate with the access point set. Correspondingly, the member access point in the access point set receives the second association request frame.

At step 300b2 (S300b2), after receiving the second association request frame, the member access point sends a parameter request frame to the control access point.

Optionally, in S300b2, before sending the parameter request frame to the control access point, the member access point may determine that the control access point has not allocated the first parameter to the member access point, or determine that all parameters in the second set (and the third set) in the first parameter allocated to the control access point are allocated to the station.

In addition, when the control access point does not pre-allocate the second set (and the third set) to the member access point, after receiving the second association request frame of the station, the member access point directly sends the parameter request frame to the control access point.

Scenario 5: The control access point is triggered by the station to enable parameter allocation.

In the scenario 5, as shown in FIG. 3, before S301, the method further includes the following steps.

At step 300c (S300c), after entering a coverage area of the access point set, the station sends a second association request frame to the access point set, where the second association request frame is used by the station to request to associate with the access point set. Correspondingly, the control access point in the access point set receives the second association request frame.

After determining, after receiving the second association request frame, that the control access point has not allocated the first parameter to the access point in the access point set, the control access point starts S301 and S302.

In addition, in the foregoing scenario 3 and scenario 4, if the first parameter that the member access point request to obtain includes an antenna identifier, optionally, the parameter request frame further includes a quantity of antennas supported by the member access point. In this way, when allocating the first set to the member access point, the access point may allocate a corresponding quantity of antenna identifiers based on the quantity of antennas supported by the member access point.

In the communications system, an AID is used as an identifier of the access point and a station identifier. It should be noted that the AID in this embodiment is an integer. In addition, in a conventional communications system, an AID equal to 255 is generally used for broadcasting. Therefore, to improve compatibility of the communications system, in this embodiment, neither a value range of the identifier of the access point nor a value range of the station identifier includes the AID equal to 255.

Optionally, a value range of the identifier of the member access point includes an association identifier AID that belongs to [1, 254], and/or an AID that is greater than 255.

A value range of the identifier of the control access point includes at least one of the following: an AID that is equal to 0, an AID that belongs to [1, 254], and an AID that is greater than 255.

The value range of the station identifier includes an AID that belongs to [1, 254], and/or an AID that is greater than 255.

Certainly, both an identifier that is of each access point (including the member access point and the control access point) and that is allocated by the control access point and each station identifier that is in the second set and that is allocated to each access point are unique.

Optionally, the control access point may perform S302 by using the following step:

The control access point sends a second frame to the member access point, and the second frame carries the first parameter.

It may be learned from the foregoing descriptions that the first parameter may be a first parameter allocated to one member access point, or may be first parameters allocated to a plurality of member access points. Therefore, a structure of the second frame is also different based on different content included in the first parameter, for example, in the following implementations.

In a first implementation, the first parameter includes an access point identifier that is allocated by the control access point to each access point.

In the first implementation, an identifier of each member access point is sent to a corresponding member access point by using one second frame.

In a first design of the first implementation, the control access point may send the identifier of each member access point to the member access point by using a conventional association feedback frame.

For example, when the communications system supports a centrally controlled PCP/AP clustering technology specified in the 802.11ad standard, the control access point may allocate a corresponding identifier to each member access point by allocating a station identifier to the station. In other words, when any member access point sends a first association request frame to the control access point, the control access point allocates a corresponding identifier to the member access point.

In a second design of the first implementation, the second frame is a new frame that is different from a conventional frame, and is used by the control access point to send an identifier of each member access point to the member access point.

In a first example of the second design, a structure of the second frame is shown in FIG. 4a.

In a second example of the second design, the identifier allocated to the member access point may be used as an element and encapsulated into the second frame together with another element (for example, another control parameter sent by the control access point to the member access point), and a structure of the second frame is shown in FIG. 4b.

In a second implementation, the first parameter includes a first set that is allocated by the control access point to the access point in the access point set.

Descriptions are provided below by using an example in which the member access point sends a parameter request frame to the control access point to request to obtain the first parameter.

In a first design, the parameter request frame may be a first association request frame (association request frame), and the second frame is an association feedback frame.

In an example of the first design, a structure of the first association request frame is shown in FIG. 5. In other words, a new parameter, namely, a quantity N of antennas supported by the member access point, is added to a structure of a conventional association request frame, where N is a positive integer.

Corresponding to the structure of the first association request frame shown in FIG. 5, a structural diagram of the association feedback frame is shown in FIG. 6a to FIG. 6d.

In a first example of the first design, the association feedback frame includes N antenna identifiers (a first set) allocated by the control access point to the member access point, and the structure of the association feedback frame is shown in FIG. 6a.

In a second example of the first design, the association feedback frame includes not only N antenna identifiers (a first set) allocated by the control access point to the member access point, but also a quantity N of antenna identifiers allocated by the control access point to the member access point. The structural diagram of the association feedback frame is shown in FIG. 6b.

In a third example of the first design, the association feedback frame does not include a quantity N of antenna identifiers allocated by the control access point to the member access point, but an indication field is added before or after each antenna identifier to indicate whether there is still another antenna identifier after the antenna identifier. The structural diagram of the association feedback frame is shown in FIG. 6c and FIG. 6d.

In a second design, both the parameter request frame and the second frame may be new frames used for access point interaction, for example, an access point set management frame.

In an example of the second design, the parameter request frame may be an independent frame, and a structure of the parameter request frame is shown in FIG. 7a.

In another example of the second design, a quantity of member access points may be used as an element and encapsulated into the parameter request frame together with another element, and a structure of the parameter request frame is shown in FIG. 7b.

Corresponding to the structures of the parameter request frame shown in FIG. 7a and FIG. 7b, a structural diagram of the second frame is shown in FIG. 8a to FIG. 8e.

In a first example of the second frame, the second frame includes N antenna identifiers (a first set) allocated by the control access point to the member access point, and a structure of the second frame is shown in FIG. 8a.

In a second example of the first design, the second frame includes not only N antenna identifiers (a first set) allocated by the control access point to the member access point, but also a quantity N of antenna identifiers allocated by the control access point to the member access point. The structural diagram of the second frame is shown in FIG. 8b.

In a third example of the first design, the second frame does not include a quantity N of antenna identifiers allocated by the control access point to the member access point, but an indication field is added before or after each antenna identifier to indicate whether there is still another antenna identifier after the antenna identifier. The structural diagram of the second frame is shown in FIG. 8c and FIG. 8d.

In a fourth example of the first design, the N antenna identifiers allocated by the control access point to the member access point may be encapsulated into the second frame together with another element as one element. For distribution of the N antenna identifiers allocated by the control access point to the member access point in the second frame, refer to FIG. 8a to FIG. 8d. In this example, a structure of the second frame is shown in FIG. 8e.

It should be further noted that, when the member access point does not need to send the parameter request frame to the control access point, the structure of the second frame may also be the structures shown in FIG. 6a to FIG. 6d and FIG. 8a to FIG. 8e. This is not limited in the embodiments.

In a third implementation, the first parameter includes a second set (optionally, further including a third set) that is allocated by the control access point to the access point in the access point set.

In the third implementation, the control access point may allocate the second set (and the third set) to the access point in the access point set by using the following two methods, but is not limited to the following two methods:

In a first method, the control access point is not triggered by the station (in other words, the control access point does not need to receive the parameter request frame of the member access point, or the member access point actively sends the parameter request frame without receiving the second association request frame of the station), and actively pre-allocates the second set (and the third set) to the access point in the access point set.

In a second method, the control access point is triggered by the station to start allocation of the second set (and the third set), in other words, after the station sends the second association request to the member access point in the access point set, the member access point sends the parameter request frame to the control access point.

In a first design of the first method, the second frame sent by the control access point to the member access point may be an association feedback frame.

In a first example of the first design, the second set (and the third set) may be distributed in the association feedback frame in a list manner. Optionally, a structure of the association feedback frame is shown in FIG. 9a and FIG. 9b. In FIG. 9b, the station parameter allocated to the member access point includes a station AID allocated to the member access point (and a security key allocated to the member access point).

In a second example of the first design, the second set (and the third set) may be distributed in the association feedback frame in a value range manner. Optionally, a structure of the association feedback frame is shown in FIG. 9c and FIG. 9d.

In a third example of the first design, based on the example shown in FIG. 9a, the association feedback frame does not include a quantity M of AIDs allocated to the member access point, but a first indication field is added before or after each station AID allocated to the member access point, to indicate whether another station AID allocated to the member access point exists after the station AID allocated to the member access point. Optionally, the association feedback frame may not include a quantity S of security keys allocated to the member access point, but a second indication field is added before or after each security key allocated to the member access point, to indicate whether another security key allocated to the member access point exists after the security key allocated to the member access point.

Similarly, in a fourth example of the first design, based on the example shown in FIG. 9b, the association feedback frame does not include a quantity L of station parameters allocated to the member access point, but an indication field is added before or after each station parameter allocated to the member access point, to indicate whether another station parameter allocated to the member access point exists after the station parameter allocated to the member access point.

Similarly, in a fifth example of the first design, based on the example shown in FIG. 9d, the association feedback frame does not include a quantity L of station AID ranges allocated to the member access point, but a first indication field is added before or after each station AID range allocated to the member access point, to indicate whether another station AID range allocated to the member access point exists after the station AID range allocated to the member access point. Optionally, the association feedback frame does not include a quantity of security key ranges allocated to the member access point, but a second indication field is added before or after the security key range allocated to the member access point, to indicate whether another security key range allocated to the member access point exists after the security key range allocated to the member access point.

In a second design of the first method, the second frame sent by the control access point to the member access point may be an independent frame.

In the second design, for a distribution situation in the second set (and the third set) in the second frame, refer to the distribution situation in the second set (and the third set) in the association feedback frame in each example in the first design.

In a first example of the second design, the second frame may be an independent frame, and a structure of the second frame is shown in FIG. 10a.

In a second example of the second design, the second set (and the third set) may be encapsulated in the second frame together with another element as one element, and a structural diagram of the second frame is shown in FIG. 10b.

In a first design of the second method, the parameter request frame may be used as an independent frame.

In a first example of the first design, the parameter request frame may be used to request to obtain station parameter configuration of one station, and a structure of the parameter request frame is shown in FIG. 11a.

In a second example of the first design, the parameter request frame may be used to request to obtain station parameter configuration of at least one station, and a structure of the parameter request frame is shown in FIG. 11b.

In a third example of the first design, based on the second example, the parameter request frame does not include a quantity N of requested stations, but an indication field is added before an identifier of each station or after (another related parameter of each station), to indicate whether there is still another station after the station.

In a second design of the second method, information about the requested station may be encapsulated into the parameter request frame together with another element as one element of the parameter request frame.

In the second design, for a distribution situation of the information about the requested station in the parameter request frame, refer to a distribution situation of the information about the requested station in each example in the first design.

In an example of the second design, a structure of the parameter request frame is shown in FIG. 11c.

In a third design of the second method, the second frame may be an independent frame.

In a first example of the third design, the second frame includes station parameter configuration of one station, and a structure of the second frame is shown in FIG. 12a.

Figure 12B:
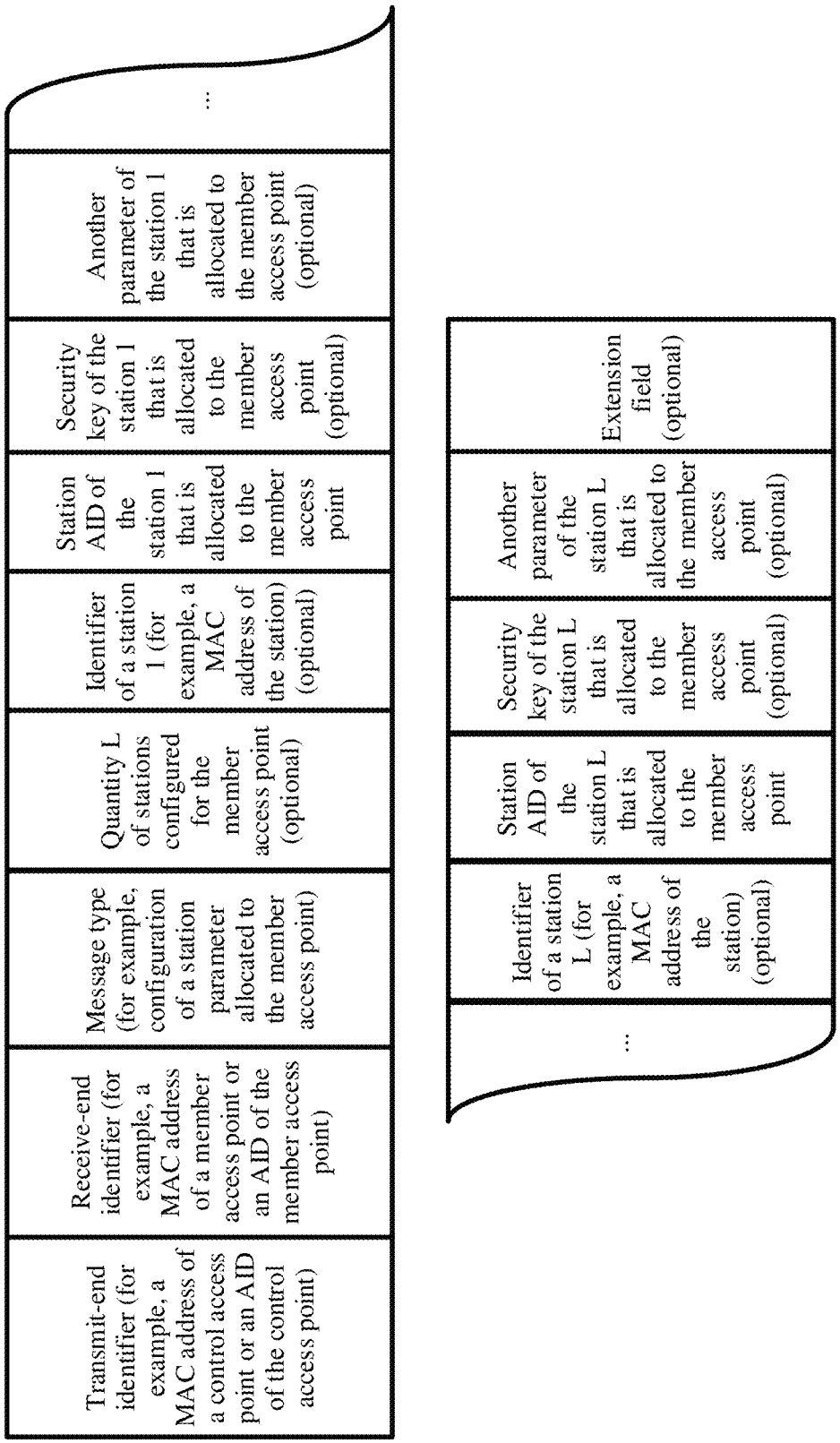
FIG. 12b is a structural diagram of a second frame according to an embodiment.

In a second example of the third design, the second frame includes station parameter configuration of a plurality of stations, and a structure of the second frame is shown in FIG. 12b. A quantity of stations configured for the member access point in the second frame is less than or equal to a quantity of stations requested in the parameter request frame sent by the member access point. When the quantity of stations configured for the member access point is less than the quantity of stations requested in the parameter request frame sent by the member access point, a field including "quantity of stations configured for the member access point" may be added to the second frame.

Figure 12C:
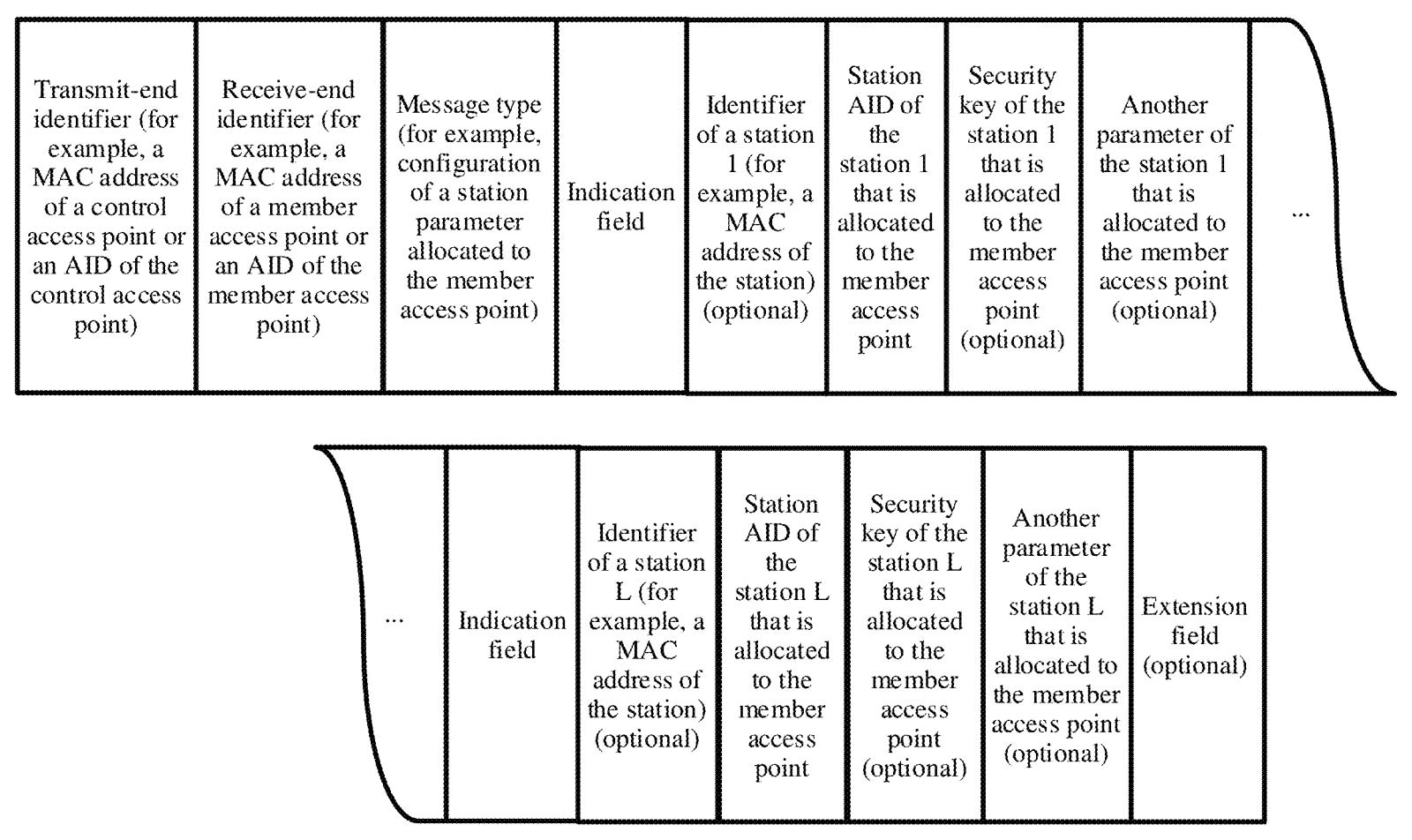

In a third example of the third design, based on the structure of the second frame shown in the second example, in this example, the second frame does not include a quantity L of station parameters allocated to the member access point, but an indication field is added before or after a station parameter of each station, to indicate whether there is still a station parameter of another station after the station parameter of the station. A structure of the second frame is shown in FIG. 12c.

In a fourth design of the second method, the station parameter configured by the control access point for the member access point may be encapsulated into the second frame together with another element as one element. For a distribution situation of station parameters in the second frame, refer to a distribution situation of the station parameters in the second frame in each example in the third design.

Figure 12D:
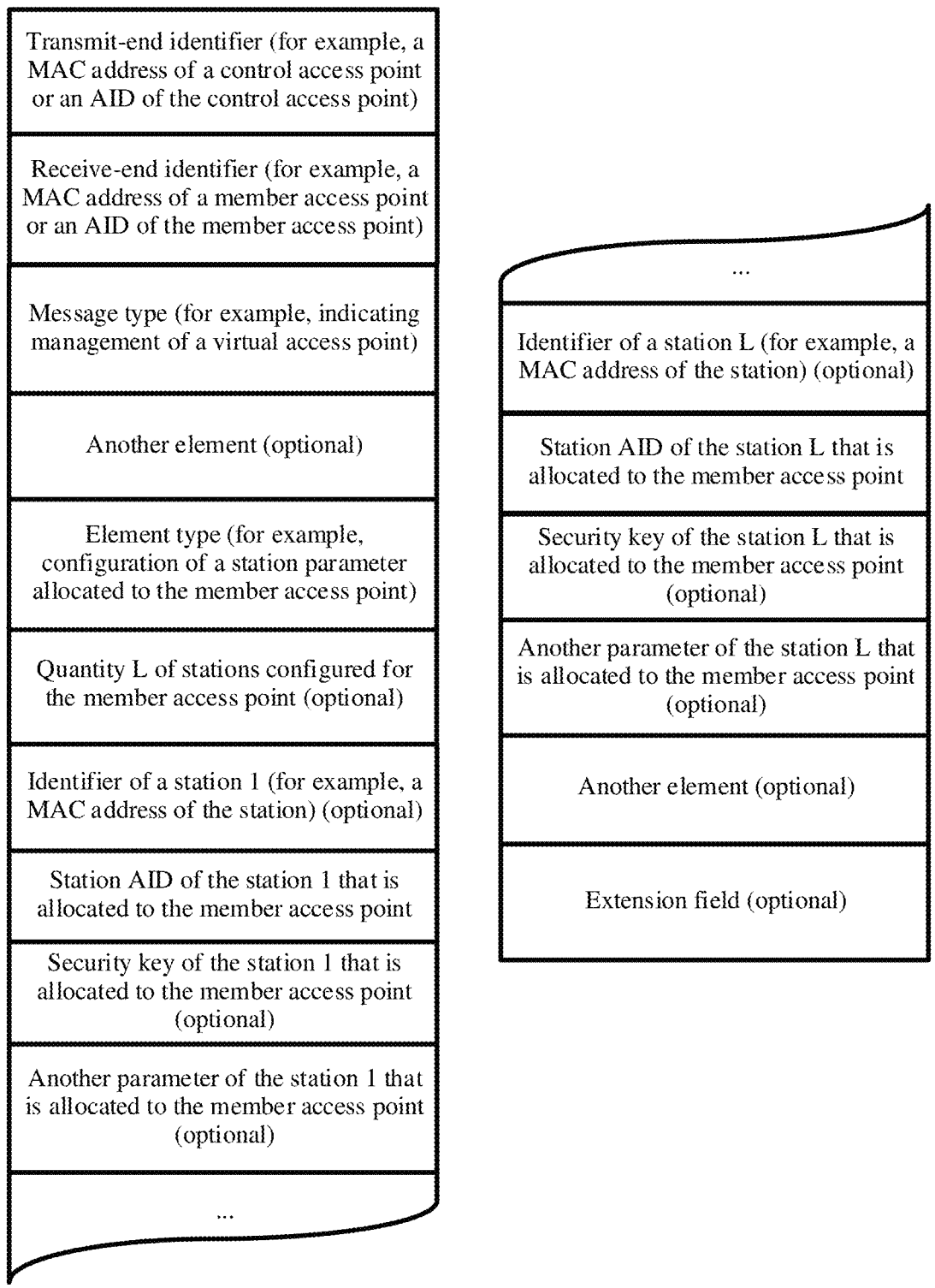
FIG. 12d is a structural diagram of a second frame according to an embodiment.

In a first example of the fourth design, a structure of the second frame is shown in FIG. 12d.

It should be further noted that a structure of each frame provided in this embodiment is only an example, and a sequence of parameters included in each frame is not limited in this embodiment. Optionally, the second frame may include any one of the following combinations at the same time: the identifier allocated to the member access point, the first set allocated to the member access point, the second set allocated to the member access point, and the third set allocated to the member access point. In addition, the control access point may encapsulate all first parameters allocated to a plurality of member access points into one second frame, and send the second frame through broadcasting or multicasting, to improve control and management efficiency and sending efficiency of the control access point, and reduce signaling overheads in the communications system. Optionally, a structure of the second frame is shown in FIG. 12e. For a distribution situation of a first parameter allocated to each member access point in the second frame, refer to a distribution situation of a first parameter allocated to one member access point in the second frame in each design and example in the foregoing implementations. Details are not described herein again.

Figure 13:
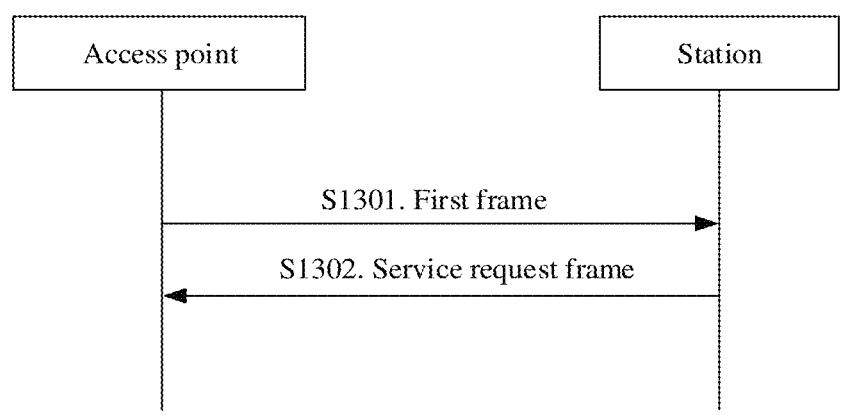
FIG. 13 is a flowchart of a communication method according to an embodiment.

Based on the foregoing embodiment, an embodiment further provides a communication method, and the method is applicable to the communications system shown in FIG. 2b. In the embodiment shown in FIG. 3, the communication method is performed after the control access point in the access point set allocates at least an identifier of an access point and a first set to the access point in the access point set. Referring to FIG. 13, a process of the method includes the following steps.

At Step S1301 (S1301), an access point in an access point set sends a first frame to a station. Correspondingly, the station receives at least one first frame sent by the access point in the access point set.

Any first frame includes a sending address and an antenna identifier, and an antenna corresponding to the antenna identifier is used when the access point sends the first frame.

First frames sent by different access points in the access point set include the same sending address, and the sending address includes an identifier of the control access point or an identifier of the access point set. The first frames sent by the different access points include different antenna identifiers, and first frames sent by a same access point by using different antennas also include different antenna identifiers.

Certainly, an antenna identifier included in a first frame sent by any access point belongs to a first set in a first parameter allocated by the control access point to the access point.

Optionally, the first frame may be at least one of the following types of frames: a MAC frame, a PHY frame, and the like.

The MAC frame includes at least one of the following: a beacon frame, a management frame, a data frame, a control frame, and the like. This is not limited in the embodiments.

By using this step, the first frames sent by the different access points in the access point set to the station include the same sending address, and the access point set may be considered as one access point. In this way, when the station moves or changes a direction, an access point that provides a communication service for the station changes from one access point in the access point set to another access point. Because first frames sent by access points in the access point set include a same sending address, the station cannot perceive a change even if the station communicates with different access points before and after the station moves or changes the direction, and the station also considers the access point set as one access point. In this way, the station does not need to perform an access point switching process, thereby avoiding station service interruption and signaling overheads that are caused by the access point switching process.

Optionally, in the communications system, a beam training process may be performed by using S1301 in the following several manners, but is not limited to the following manners:

Manner 1: Each access point in the access point set may send the first frame (namely, a beacon frame) in a different sector direction within a BTI of a beacon period of the access point.

Manner 2: At least one access point in the access point set may send the first frame (a frame that is similar to a beacon frame or a sector sweep frame and that is used for beam training) in different sector directions outside a BTI of the access point, for example, in a time period in which a service of the station is idle or a time period in which beam training needs to be performed.

Optionally, in the manner 1, in a BTI of each access point, the access point may support sending of the beacon frame that is performed by using at least one antenna and at least one sector.

A process in which the access point sends the beacon frame is described below by using a communications system that uses a PCP/AP clustering technology in the 802.11ad standard.

In the communications system that uses the PCP/AP clustering technology in the 802.11ad standard, to alleviate an interference problem, a BTI/BHI of each access point scheduled by the communications system does not overlap in terms of time, and each access point schedules one beacon service period (beacon SP) for a BTI/BHI of each of other access points. When a BTI/BHI of an access point a is in a beacon service period of another access point, the another access point cannot send data, and a station to which the another access point provides a service cannot send data either. The access point a may send a beacon frame in a sector sweeping manner in the BTI/BHI of the access point a. In this way, the beacon service period of the another access point may protect the BTI/BHI of the access point a from being interfered with by a signal sent by another access point or station.

Figure 14A:
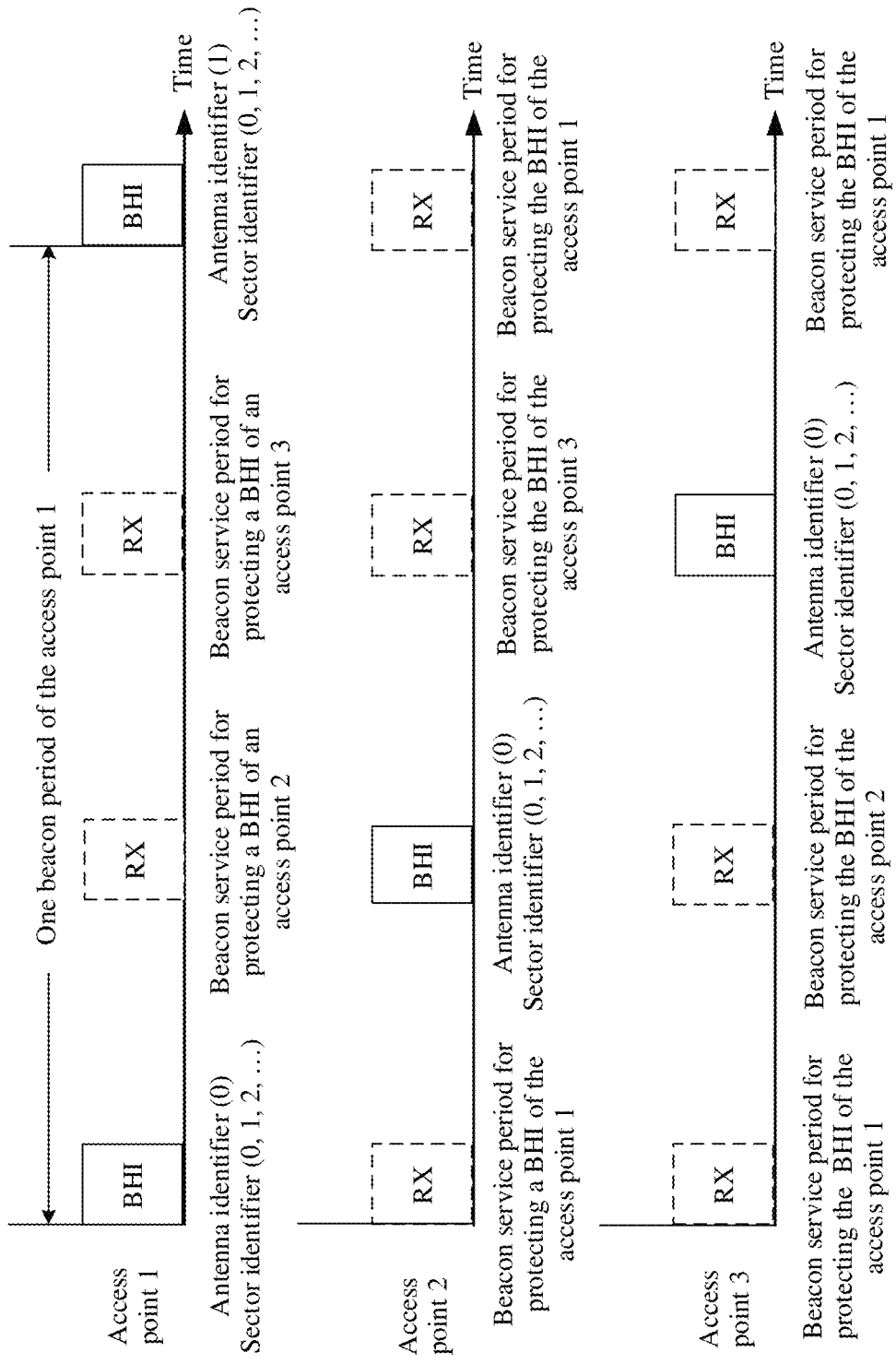
FIG. 14a is a schematic diagram of sending a beacon frame by an access point according to an embodiment.

In a conventional communications system, in one BTI/BHI, an access point cannot replace an antenna used for sending a beacon frame. Therefore, in the conventional communications system that supports a centrally controlled PCP/AP clustering technology, a case of sending a beacon frame by each access point is shown in FIG. 14a. In a BHI of each access point, another access point cannot send data, and a station to which the another access point provides a communication service cannot send data either, as shown by a location of an identifier RX shown in FIG. 14*a*.

In the communications system in this embodiment, each access point may send a beacon frame by using a plurality of antennas in a BTI/BHI. In a BHI of each access point, another access point cannot send data, and a station to which the another access point provides a communication service cannot send data either. This is described below by using FIG. 14*b* as an example. In a BHI of each access point in FIG. 14*b*, neither another access point nor a station to which the another access point provides a communication service can send data, as shown by a location of an identifier RX shown in the figure.

Figure 14B:
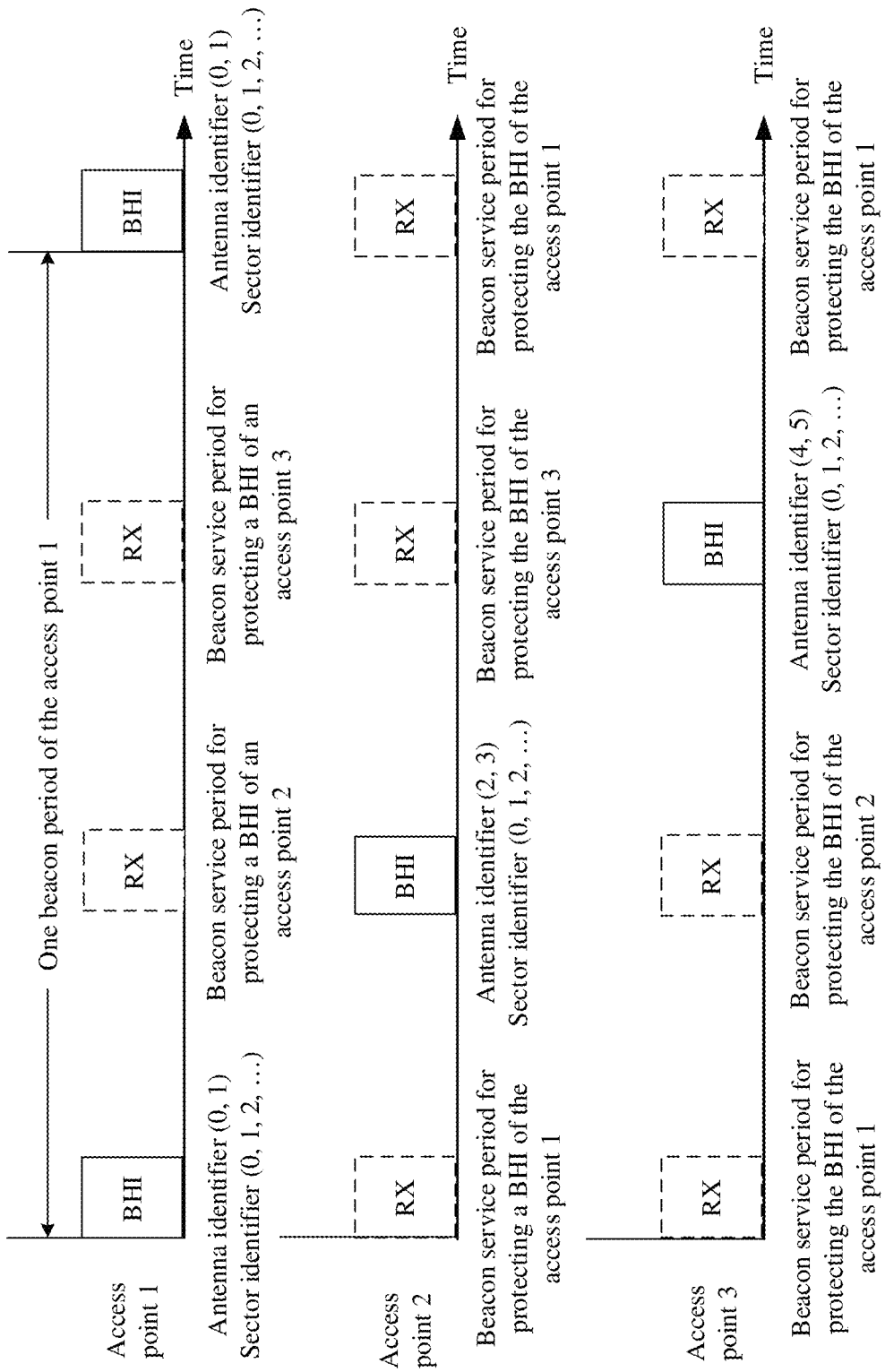
FIG. 14b is a schematic diagram of sending a beacon frame by an access point according to an embodiment.
Figure 15:
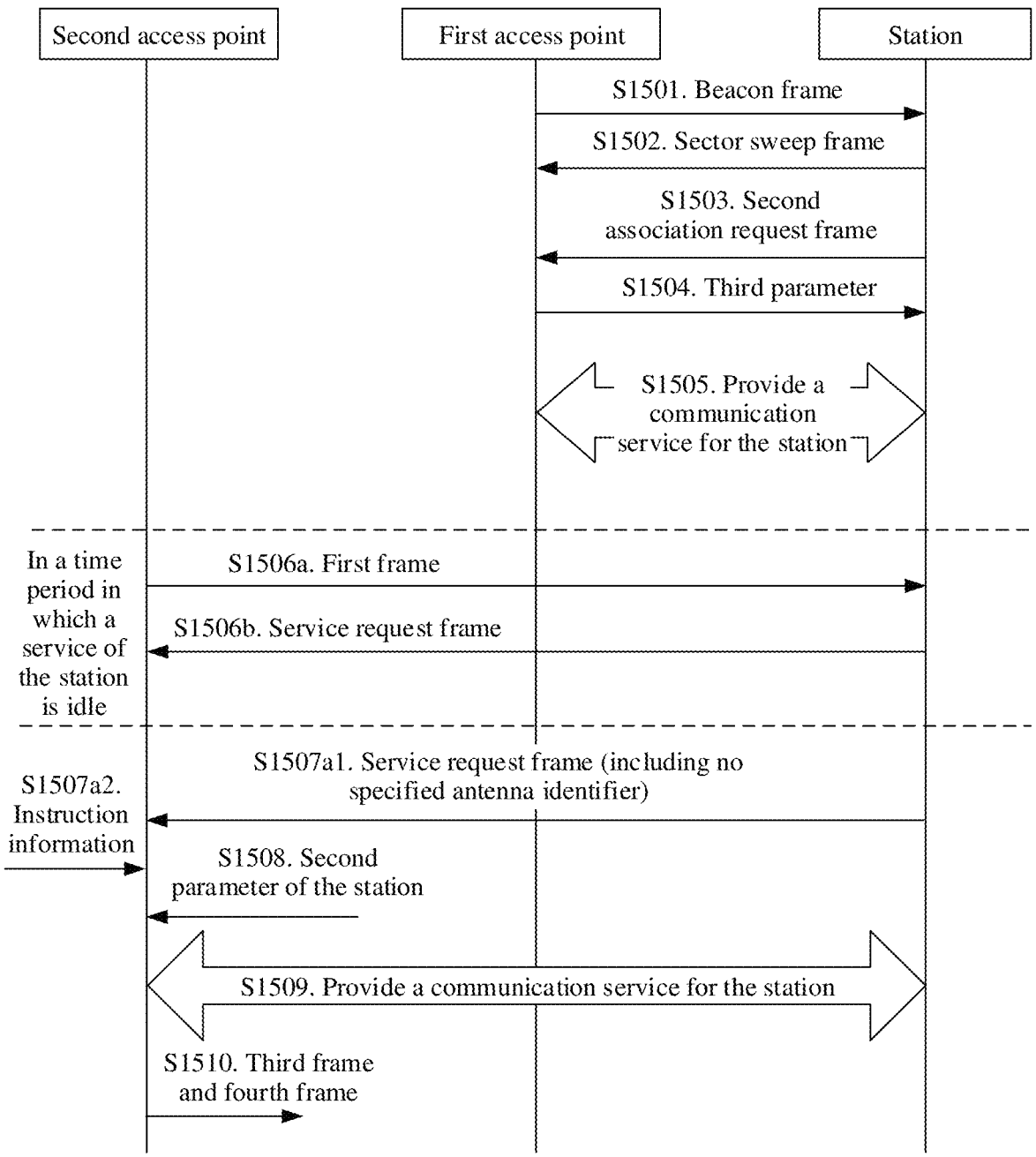
FIG. 15 is a flowchart of a communication method according to an embodiment.

In addition, in the conventional communications system, for example, as shown in FIG. 14*a*, different access points may send beacon frames by using a same antenna identifier. As shown in the figure, an access point 1, an access point 2, and an access point 3 may send beacon frames by using a same antenna identifier (0) in respective BHIs. In the communications system in this embodiment, for example, as shown in FIG. 14*b*, different access points send beacon frames by using different antenna identifiers in respective BHIs. As shown in the figure, an access point 1 sends a beacon frame by using an antenna identifier (0, 1), an access point 2 sends a beacon frame by using an antenna identifier (2, 3), and an access point 3 sends a beacon frame by using an antenna identifier (4, 5).

When a beam training process is performed by using S1301 in the communications system, the communication method further includes the following step:

At Step 1302 (S1302), the station sends a service request frame to the access point, where the service request frame includes a specified antenna identifier used by the access point that can provide a communication service for the station, and the specified antenna identifier is an antenna identifier included in a first frame that is in the at least one first frame and that meets a preset condition.

In a scenario of the manner 1, the service request frame is a sector sweep frame that is sent by the station in an A-BFT interval of the access point. Optionally, in this embodiment, the access point may use, in the A-BFT interval of the access point, one receive antenna or a plurality of receive antennas to receive the sector sweep frame sent by the station.

In a scenario of the manner 2, the service request frame is a frame that is similar to the sector sweep frame and that is used for beam training.

By using S1302, after receiving the service request frame, the access point may determine an antenna selected by the station, so that when a service is subsequently provided for the station, an antenna corresponding to an antenna identifier included in the server request frame may be used, to ensure signal transmission efficiency between the station and the access point.

Optionally, the first frame that is in the at least one first frame and that meets the preset condition includes:

a first frame that is in the at least one first frame and whose signal quality is greater than or equal to a preset threshold, and/or a first frame with best signal quality in the at least one first frame.

In the foregoing manner, the station may select an antenna with relatively high transmission quality from a plurality of antennas used when the access point sends the first frame, to ensure that the antenna with relatively high transmission quality selected by the station can be used when the access point subsequently provides a service for the station, thereby ensuring signal transmission efficiency between the station and the access point.

Based on the foregoing embodiment, an embodiment further provides a communication method, and the method is applicable to the communications system shown in FIG. 2*b*. In the embodiment shown in FIG. 3, the communication method is performed after the control access point in the access point set allocates at least an identifier of an access point and a first set to the access point in the access point set. The method is used by the access point set to provide a communication service for the station. As shown in FIG. 13, a process of the method includes the following steps.

Figure 16A:
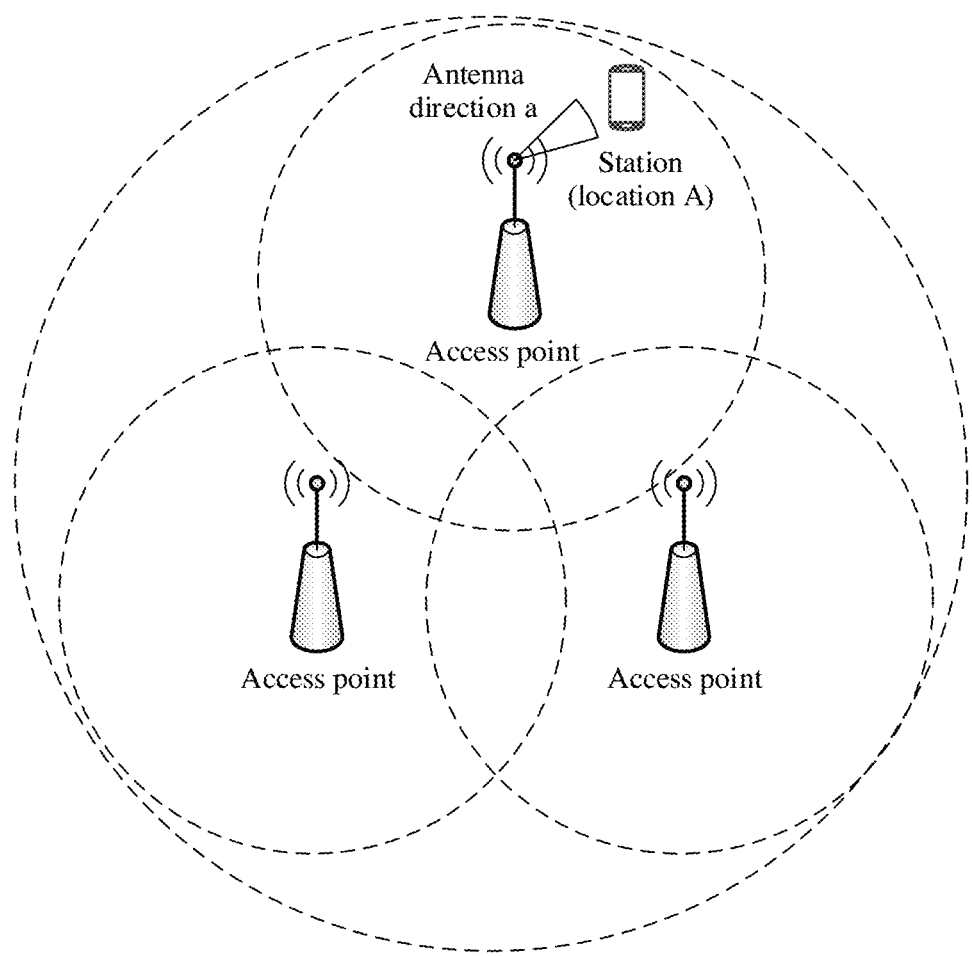
FIG. 16a is a schematic diagram of a communication scenario according to an embodiment.

At step S1501 (S1501), each access point in the access point set may send a beacon frame in a different sector direction in a BTI of the access point, for example, send the beacon frame in a manner shown in FIG. 14*b*. Correspondingly, the station enters a coverage area of the access point set. At a station location A shown in FIG. 16*a*, the station receives at least one beacon frame sent by a first access point in the access point set.

The first access point may be a control access point or a member access point.

At step S1502 (S1502), the station sends a sector sweep frame to the first access point that sends the at least one beacon frame or to the access point set, where the sector sweep frame includes a specified antenna identifier used by the access point that can provide a communication service for the station, and the specified antenna identifier is an antenna identifier included in a beacon frame that is in the at least one beacon frame and that meets a preset condition.

The preset condition is that signal quality of the beacon frame is the best when the signal quality of the beacon frame is greater than or equal to a preset threshold.

At step S1503 (S1503), the station sends a second association request frame to the access point set, where the second association request frame is used by the station to request to associate with the access point set.

At step S1504 (S1504), after receiving the second association request frame, the first access point in the access point set sends, to the station, a third parameter allocated to the station.

The third parameter includes a station identifier allocated to the station. Optionally, the third parameter further includes a security key allocated to the station.

When the first access point is the member access point, the control access point in the access point set has allocated a second set to the first access point, and not all station identifiers in the second set are allocated to the station, the first access point may allocate, to the station, a station identifier that is in the second set and that is not allocated to the station.

When the first access point is the member access point, the control access point has not allocated a second set to the first access point, or the control access point has allocated a second set to the first access point, but all station identifiers in the second set are allocated to the station, the first access point may send a parameter request frame to the control access point, to request the control access point to allocate the second set to the first access point. After the control access point allocates the second set to the first access point, the first access point selects a station identifier from the second set and allocates the station identifier to the station.

When the first access point is the control access point, the control access point has allocated a second set to the control access point, and not all station identifiers in the second set are allocated to the station, the control access point may allocate, to the station, a station identifier that is in the second set and that is not allocated to the station.

When the first access point is the control access point, the control access point has not allocated a second set to the control access point, or the control access point allocates, to the station, all station identifiers in the second set allocated to the control access point, the control access point may continue to allocate the second set to the control access point. After the control access point allocates the second set to the control access point, the control access point selects a station identifier from the second set and allocates the station identifier to the station.

In addition, a process in which the first access point allocates a security key to the station is similar to a process in which the first access point allocates the station identifier to the station. For details, refer to the foregoing descriptions. Details are not described herein again.

At step S105 (S105), after at least one access point (including the first access point) in the access point set receives the sector sweep frame sent by the station, each of the at least one access point determines whether at least one antenna identifier in the first set allocated by the control access point to the access point includes the specified antenna identifier included in the sector sweep frame. When the specified antenna identifier includes one antenna identifier, after the first access point determines that the at least one antenna identifier allocated by the control access point to the first access point includes the specified antenna identifier, the first access point provides a communication service for the station, in other words, a signal is transmitted between the first access point and the station by using the third parameter. When the specified antenna identifier includes a plurality of antenna identifiers, and the at least one access point in the access point set separately determines that the at least one antenna identifier allocated by the control access point to the first access point includes at least one antenna identifier in the specified antenna identifier, the at least one access point selects, by using the control access point, an access point that provides a service for the station, and after the control access point selects and instructs the first access point to provide a service for the station, the first access point provides a communication service for the station according to the instruction of the control access point.

Optionally, in this embodiment, before providing a communication service for the station, any access point may send a service response frame to the station, to notify the station that the access point subsequently provides the communication service for the station, where the service response frame is used to instruct the access point to provide the communication service for the station.

Optionally, the access point in the access point set may perform beam training with the station in advance by using the following steps.

At step 1506a (S1506a), in a time period in which a service of the station is idle, the access point (whose quantity is not limited, and whether the access point is the first access point or a second access point in the figure is not limited) in the access point set may send a first frame (a frame that is similar to the beacon frame or a sector sweep frame and that is used for beam training) in different sector directions outside a BTI of the access point. Correspondingly, the station receives at least one first frame sent by the access point.

At step 1506b (S1506b), the station sends a service request frame (a frame that is similar to the sector sweep frame and that is used for beam training) to an access point that sends at least one first frame, where the service request frame sent to any access point includes a specified antenna identifier used by the access point that can provide a communication service for the station, and the specified antenna identifier is an antenna identifier included in a first frame that is in the at least one first frame and that is sent by the access point and meets a preset condition.

The preset condition is that signal quality of the first frame is the best when the signal quality of the first frame is greater than or equal to the preset threshold.

By using S1506a and S1506b, the access point in the access point set may perform beam training with the station in advance without affecting the service of the station. In this way, when the station meets a condition of switching an access point that provides a communication service for the station, another access point that has finished beam training may quickly replace an original access point, and continue to provide the communication service for the access point.

Figure 16B:
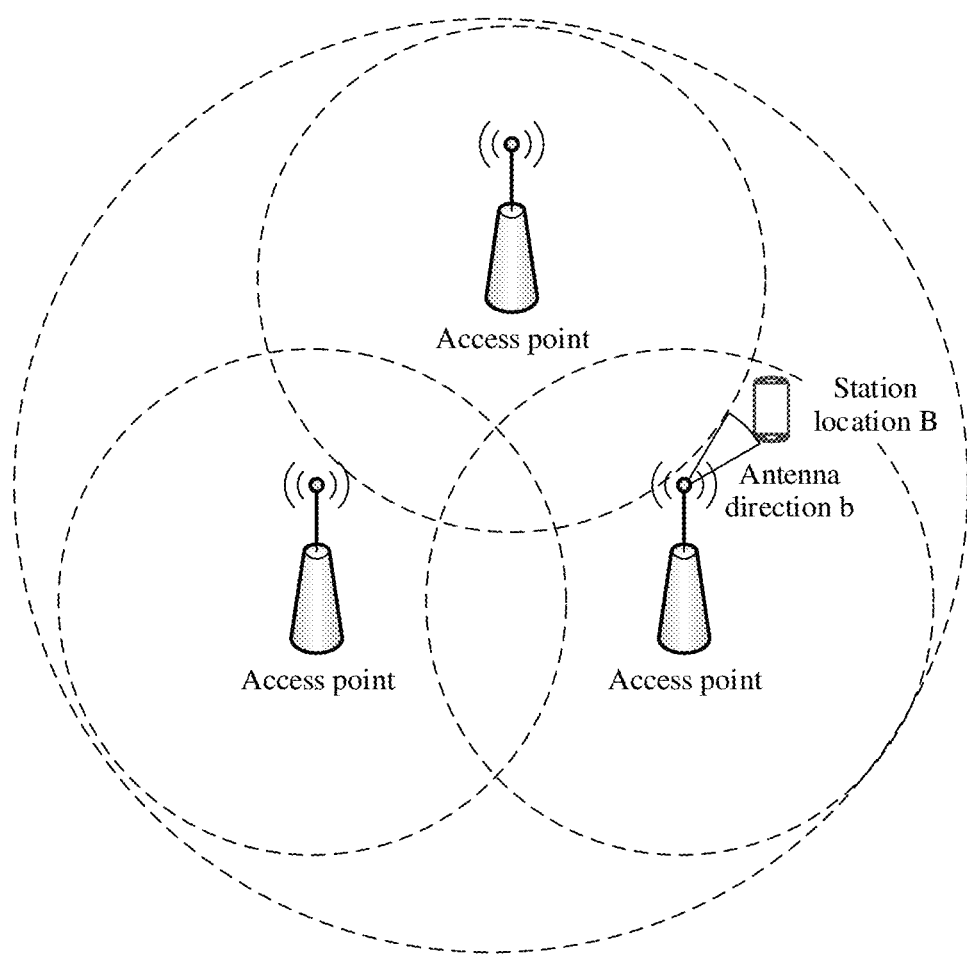
FIG. 16b is a schematic diagram of a communication scenario according to an embodiment.

When the station moves within the coverage area of the access point set and moves to a location B, as shown in FIG. 16b, because the station is relatively far away from the first access point, signal transmission quality between the station and the first access point deteriorates. In this case, optionally, the communications system may switch, in the following manner, the first access point that provides a service for the station to a second access point.

Manner 1:

At step S1507a1 (S1507a1), when determining that signal transmission quality between the station and the first access point is less than a specified minimum signal threshold, the station actively sends a service request frame (the service request frame does not include a specified antenna identifier, and may be referred to as an antenna conversion indication frame) to an access point (including the second access point) in the access point set. In this case, the antenna conversion indication frame is used by the station to request the access point set to switch to another access point or another antenna of the first access point to provide a communication service for the station.

In a first implementation of the manner 1, one access point in the access point set receives the antenna conversion indication frame. In this case, after receiving the antenna conversion indication frame, the access point directly uses an antenna for which beam training has been performed with the station in advance in the time period in which the service of the station is idle, to provide a communication service for the station.

In a second implementation of the manner 1, at least one access point in the access point set receives an antenna conversion indication frame sent by the station, and the at least one access point notifies the control access point that the at least one access point receives the antenna conversion indication frame sent by the station, to request the control access point to perform control and management. The control access point determines one target access point from the at least one access point in the access point set, and when the determined target access point is the control access point, the control access point provides a communication service for the station.

When the determined target access point is the member access point (for example, the second access point) in the access point set, the control access point sends instruction information to the member access point, in other words, performs S1507a2, where the instruction information is used to instruct the member access point to provide a communication service for the station.

Manner 2:

When determining that signal transmission quality between the first access point and the station is less than a specified minimum signal threshold, or determining, based on a notification of the station, that signal transmission quality between the first access point and the station is less than a specified minimum signal threshold, the first access point notifies the control access point, and the control access point indicates that a next access point that provides a communication service for the station is the second access point, or instructs another antenna of the first access point to provide a communication service for the station. When the control access point instructs the second access point to provide a communication service for the station, the second access point may directly provide the communication service for the station by using an antenna for which beam training has been performed with the station in advance in the time period in which the service of the station is idle.

Manner 3:

When determining that signal transmission quality between the first access point and the station is less than a specified minimum signal threshold, or determining, based on a notification of the station, that signal transmission quality between the first access point and the station is less than a specified minimum signal threshold, the first access point selects and instructs, based on a stored beam training result of the access point in the access point set and the station, the second access point to provide a communication service for the station, or selects another antenna of the first access point to provide communication service for the station. When the first access point instructs the second access point to provide a communication service for the station, the second access point may provide the communication service for the station by using an antenna for which beam training has been performed with the station in advance in the time period in which the service of the station is idle.

In the manner 3, a beam training result, stored by the first access point, of another access point in the access point set and the station may be notified to the first access point by the station or the another access point, or notified to the first access point by the control access point. This is not limited to the embodiments.

It should be noted that, in any manner, when the access point that provides the service for the station is switched from the first access point to the second access point, before the second access point provides the service for the station, the method further includes the following step:

At step S1508 (S1508), the second access point receives a second parameter of the station that is sent by an original access point (namely, the first access point) of the station.

Optionally, the second parameter includes at least one of the following items in the third parameter: a station identifier allocated to the station, and a security key allocated to the station. In this way, the second access point can successfully provide a communication service for the station by using the second parameter.

Optionally, the second access point may obtain the second parameter in the following manner, including:

Manner 1: The second access point receives, by using the control access point, the second parameter sent by the original access point (namely, the first access point).

Manner 2: The second access point directly receives the second parameter from the original access point (namely, the first access point). Optionally, when the communications system determines, in the manner 3, that the second access point is to replace the first access point to provide a communication service for the station, the second access point may directly receive the second parameter from the first access point in this manner.

Optionally, the second parameter may be carried in a fifth frame and is transmitted to the second access point.

In a first design, the fifth frame includes a second parameter of one station, and a structure of the fifth frame is shown in FIG. 17a.

In a second design, the fifth frame includes a second parameter of at least one station, and a structure of the fifth frame is shown in FIG. 17b.

Figure 17C:
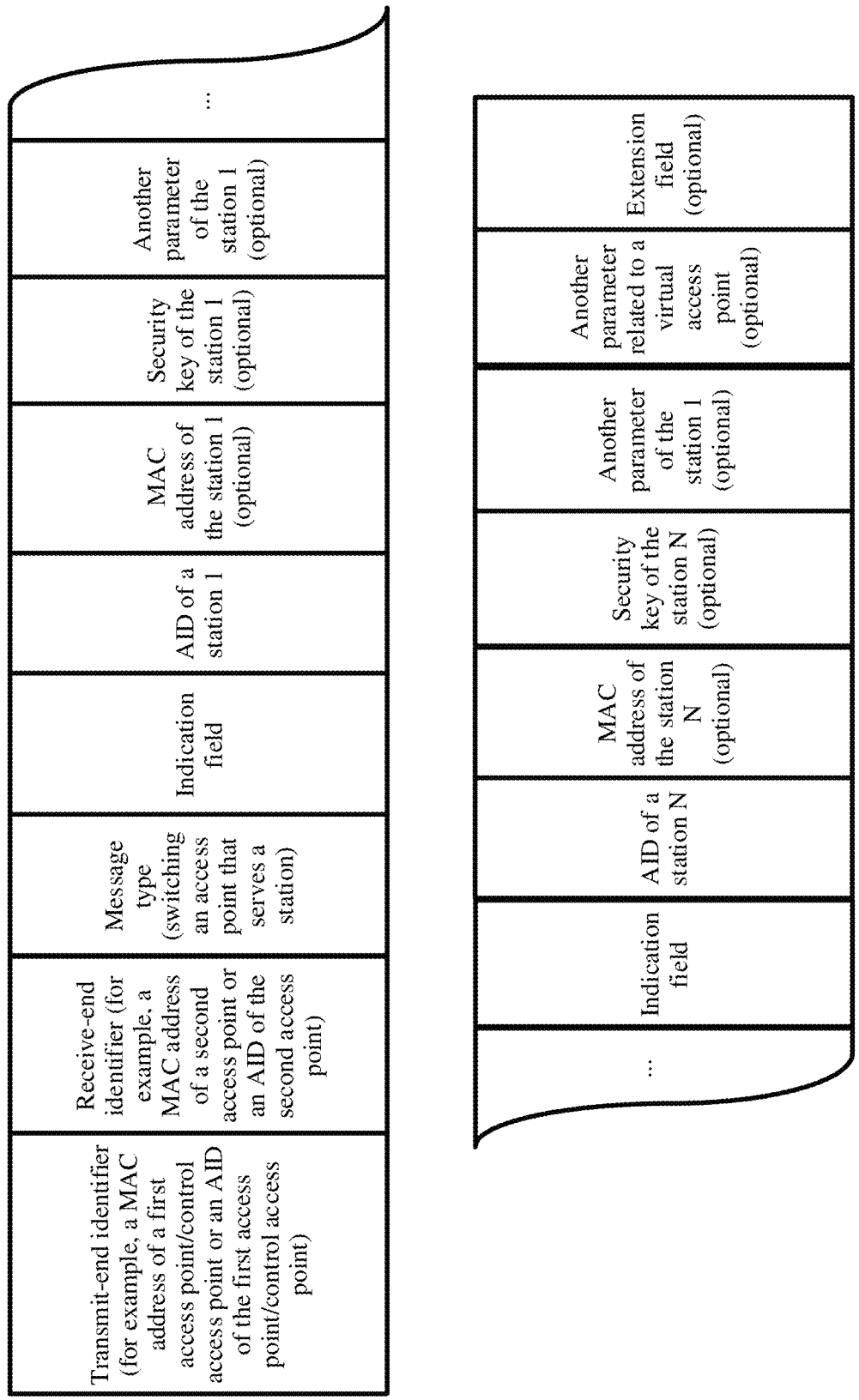
FIG. 17c is a structural diagram of a fifth frame according to an embodiment.
Figure 17D:
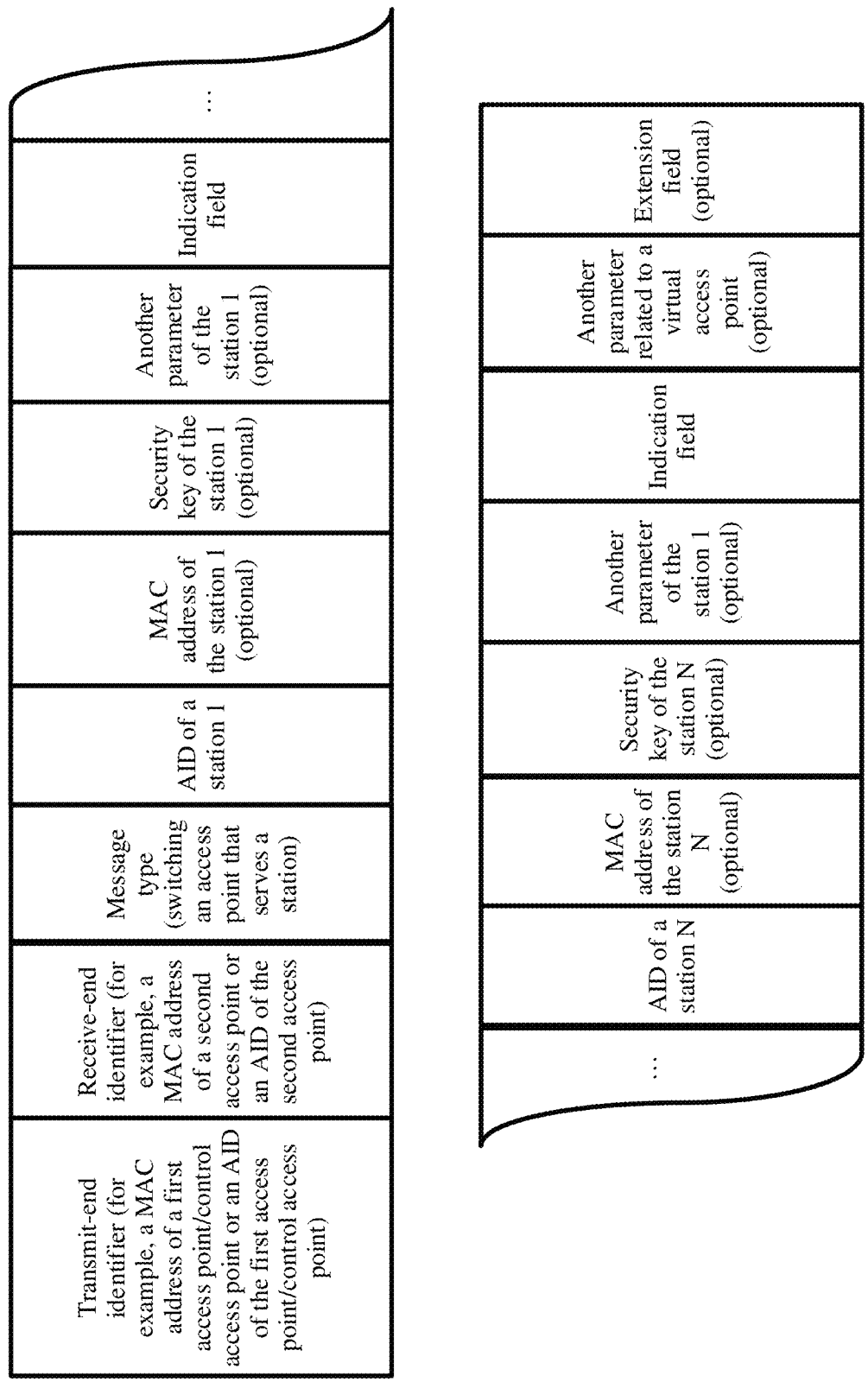
FIG. 17d is a structural diagram of a fifth frame according to an embodiment.

In a third design, based on the foregoing second design, the fifth frame does not include a quantity of stations, but an indication field is added before or after a second parameter of each station, to indicate whether there is still a second parameter of another station after the second parameter of the station. A structure of the fifth frame is shown in FIG. 17c and FIG. 17d.

In a fourth design, a second parameter of at least one station sent to the second access point may be encapsulated into the fifth frame together with another element as one element. For a distribution situation of the second parameter of the at least one station in the fifth frame, refer to distribution situations of the second parameter of the station in the foregoing three designs. Details are not described herein again.

In a fifth design, when the fifth frame is sent by the control access point to the second access point, the control access point may send, to a plurality of access points through broadcasting or multicasting, a second parameter of a station to which each of the plurality of access points provides a communication service instead. In this way, control and management efficiency and sending efficiency of the control access point can be improved, and signaling overheads in the communications system can be reduced.

It should be further noted that when the second parameter is obtained by the second access point in the manner 1, the first access point may send the second parameter to the control access point by using a seventh frame, and then the control access point transmits the second parameter to the second access point by using the fifth frame. For a structure of the seventh frame, refer to the structures of the fifth frame in the foregoing first to fourth designs. Details are not described herein again. Different from the fifth frame, in the seventh frame, a transmit-end identifier is a MAC address of the first access point, an AID of the first access point, or the like, and a receive-end identifier is a MAC address of the control access point, an AID of the control access point, or the like.

At step S1509 (S159), the second access point may provide a communication service for the station by using the second parameter of the station.

In addition, when the access point that provides the communication service for the station changes again, the station continues to perform the foregoing step. Details are not described herein again.

It should be noted that frames separately sent by the first access point and the second access point to the station include a same sending address and different antenna identifiers. Therefore, the station cannot detect a change of the access point, and for the station, the change of the access point that provides the service for the station is equivalent to serving the station by different antennas of a same access point. Apparently, the station does not need to perform an access point switching process, thereby avoiding station service interruption and signaling overheads that are caused by the access point switching process.

Figure 16C:
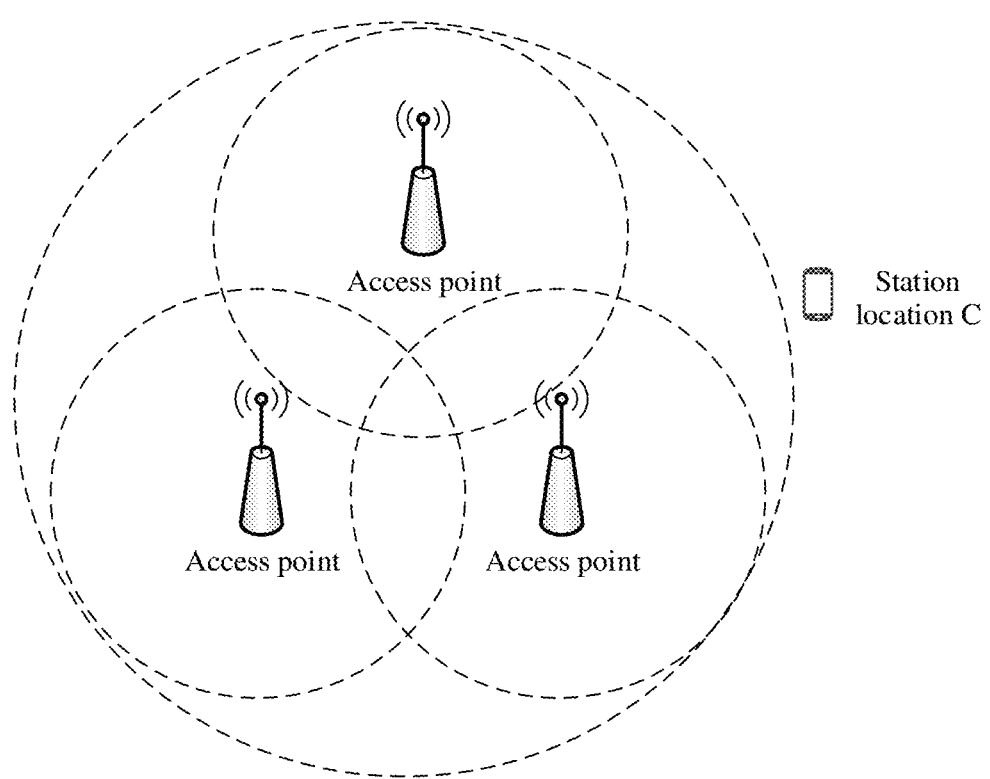
FIG. 16c is a schematic diagram of a communication scenario according to an embodiment.

When the station continues to move and moves out of the coverage area of the access point set and moves to a location C, as shown in FIG. 16c, the station is relatively far away from all the access points in the access point set. Therefore, the access point set no longer provides a communication service for the station. In this case, the communication method provided in this embodiment further includes the following step.

At step S1510, a last member access point (for example, the second access point) that is in the access point set and that provides a communication service for the station sends a third frame to the control access point, where the third frame includes the station identifier allocated by the access point to the station in S1504, so that the control access point can recycle and reuse the station identifier.

Optionally, the last member access point (for example, the second access point) that is in the access point set and that provides the communication service for the station sends a fourth frame to the control access point, where the fourth frame includes a security key allocated by the access point to the station in S1504, so that the control access point can recycle and reuse the security key.

Similarly, when the last access point that is in the access point set and that provides the communication service for the station is the control access point in the access point set, the control access point actively recycles and reuses the station identifier (and the security key) allocated to the station. Details are not described herein again.

Optionally, the second access point may encapsulate the returned station identifier and security key into a same frame (in other words, the third frame and the fourth frame are a same frame), and the frame is referred to as a sixth frame below.

In a first design, the sixth frame includes a returned group of station parameters (one group of station parameters includes a station identifier (a security key, another parameter, and the like) used by one station). A structure of the sixth frame is shown in FIG. 18a.

In a second design, the sixth frame includes at least one returned group of station parameters, and a structure of the sixth frame is shown in FIG. 18b.

In a third design, based on the second design, the sixth frame does not include a quantity of returned station parameter groups, but an indication field is added before or after each returned station parameter group, to indicate whether there is still another returned station parameter group after the returned station parameter group.

In a fourth design, a returned station parameter may be encapsulated into the sixth frame together with another element as one element. For a structure of the sixth frame, refer to the first to the third designs. Details are not described herein again.

According to the method provided in this embodiment, in a process in which an access point in the access point set provides a service for the station, in the time period in which the service of the station is idle, the access point in the access point set may perform beam training with the station in advance outside a BTI of the access point set. In this way, when the station meets a condition for switching an access point that provides a communication service for the station, another access point that has finished beam training may quickly replace an original access point, and continue to provide the communication service for the access point, so that beam training that needs to be performed by the station within a BTI of the access point in a conventional access point switching method is avoided, thereby ensuring that the station can continuously provide a service by using an antenna with relatively high transmission quality, and further ensuring service quality of the station. Further, because first frames sent by access points in the access point set include a same sending address, the station may consider the access point set as one access point, so that the station does not need to perform an access point switching process, thereby avoiding station service interruption and signaling overheads that are caused by the access point switching process.

Figure 19:
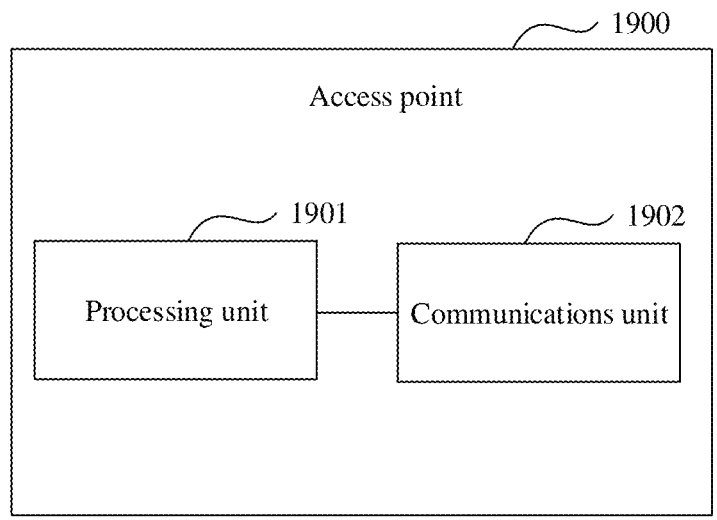
FIG. 19 is a structural diagram of an access point according to an embodiment.

Based on the foregoing embodiments, an embodiment provides an access point. The access point is applied to the communications system shown in FIG. 2b, and is configured to implement the communication methods shown in the foregoing figures. The access point is an access point in an access point set, and the access point set includes a control access point and a member access point. As shown in FIG. 19, the access point 1900 includes a processing unit 1901 and a communications unit 1902.

The processing unit 1901 is configured to generate a first frame.

The communications unit 1902 is configured to send the first frame to a station. The first frame includes a sending address and an antenna identifier, and an antenna corresponding to the antenna identifier is used when the access point sends the first frame.

First frames sent by different access points in the access point set include the same sending address, and the sending address includes an identifier of the control access point or an identifier of the access point set.

When the access point 1900 is the control access point in the access point set, the access point 1900 includes the following first to tenth implementations:

In a first implementation, the processing unit 1901 is further configured to allocate a first parameter to the access point in the access point set.

The first parameter includes at least one of the following: the identifier of the control access point, an identifier of the member access point, a first set, and a second set.

The first set includes at least one antenna identifier of the access point.

The second set includes at least one station identifier, and the at least one station identifier is allocated by the access point to the station.

The communications unit 1902 is further configured to send the first parameter to the member access point.

In a second implementation, the first parameter further includes a third set. The third set includes at least one security key, and the at least one security key is allocated by the access point to the station.

In a third implementation, when sending the first parameter to the member access point, the communications unit 1902 may be configured to:
send a second frame to the member access point, where the second frame carries the first parameter.

In a fourth implementation, the communications unit 1902 is further configured to:
before sending the first parameter to the member access point, receive a parameter request frame sent by the member access point, where the parameter request frame is used to request to obtain the first parameter.

In a fifth implementation, the parameter request frame includes a first association request frame, and the first association request frame instructs the member access point to request to associate with the control access point.

In a sixth implementation, the parameter request frame further includes a quantity of antennas supported by the member access point.

In a seventh implementation, the communications unit 1902 is further configured to:
receive a third frame sent by the member access point, where the third frame includes a station identifier that belongs to the second set.

In an eighth implementation, the communications unit 1902 is further configured to:
receive a fourth frame sent by the member access point, where the fourth frame includes a security key that belongs to the third set.

In a ninth implementation, a value range of the identifier of the member access point includes an association identifier AID that belongs to [1, 254], and/or an AID that is greater than 255; and/or
a value range of the identifier of the control access point includes at least one of the following: an AID that is equal to 0, an AID that belongs to [1, 254], and an AID that is greater than 255; and/or
a value range of the station identifier includes an AID that belongs to [1, 254], and/or an AID that is greater than 255, where
the AID is an integer.

In a tenth implementation, the processing unit 1901 is further configured to:
if at least one access point in the access point set receives a service request frame sent by the station, where the service request frame is used by the station to request the access point set to provide a communication service, determine one target access point from the at least one access point in the access point set; and
when the determined target access point is the control access point, provide a communication service for the station; or
when the determined target access point is the member access point in the access point set, send instruction information to the member access point by using the communications unit 1902, where the instruction information is used to instruct the member access point to provide a communication service for the station.

When a type of the access point 1900 is not limited, in other words, the access point 1900 may be the control access point in the access point set, or may be the member access point, the access point 1900 further includes the following eleventh to seventeenth implementations:

In an eleventh implementation, the identifier of the access point set is the AID that is equal to 0.

In a twelfth implementation, the communications unit 1902 is further configured to receive the service request frame sent by the station.

The processing unit 1901 is further configured to provide the communication service for the station.

In a thirteenth implementation, the service request frame includes a specified antenna identifier used by an access point that can provide a communication service for the station.

The processing unit 1901 is further configured to:
before the communication service is provided for the station, determine that the at least one antenna identifier of the access point includes the specified antenna identifier.

In a fourteenth implementation, the communications unit 1902 is further configured to receive a second parameter of the station that is sent by an original access point of the station. The original access point is a previous access point that is in the access point set and that provides a communication service for the station.

The processing unit 1901 is further configured to provide the communication service for the station.

In a fifteenth implementation, the second parameter includes at least one of the following: a station identifier of the station and a security key of the station.

In a sixteenth implementation, when receiving the second parameter sent by the original access point, the communications unit 1902 may be configured to:
receive, by using the control access point, the second parameter sent by the original access point; or
directly receive the second parameter from the original access point.

In a seventeenth implementation, the communications unit is further configured to: before the communication service is provided for the station, send a service response frame to the station. The service response frame is used to instruct the access point to provide the communication service for the station.

When the access point 1900 is the member access point in the access point set, the access point 1900 further includes the following seventeenth to twenty-second implementations:

In a seventeenth implementation, the communications unit 1902 is further configured to receive the first parameter sent by the control access point in the access point set.

In an eighteenth implementation, when receiving the first parameter sent by the control access point in the access point set, the communications unit 1902 may be configured to:
receive a second frame that is sent by the control access point and that carries the first parameter.

In a nineteenth implementation, the communications unit 1902 is further configured to:
before receiving the second frame that is sent by the control access point and that carries the first parameter, send a parameter request frame to the control access point, where the parameter request frame is used to request to obtain the first parameter.

In a twentieth implementation, the communications unit 1902 is further configured to:
before sending the parameter request frame to the control access point, receive a second association request frame sent by the station, where the second association request frame is used by the station to request to associate with the access point set.

In a twenty-first implementation, the communications unit 1902 is further configured to:
send a third frame to the control access point, where the third frame includes a station identifier that belongs to the second set.

In a twenty-second implementation, the communications unit 1902 is further configured to:
send a fourth frame to the control access point, where the fourth frame includes a security key that belongs to the third set.

According to the access point provided in this embodiment, first frames sent by different access points in the access point set to the station include a same sending address, and the access point set may be considered as one access point. In this way, when the station moves or changes a direction, an access point that provides a communication service for the station changes from one access point in the access point set to another access point. Because first frames sent by access points in the access point set include a same sending address, the station cannot perceive a change even if the station communicates with different access points before and after the station moves or changes the direction, and the station also considers the access point set as one access point. In this way, the station does not need to perform an access point switching process, thereby avoiding station service interruption and signaling overheads that are caused by the access point switching process.

Figure 20:
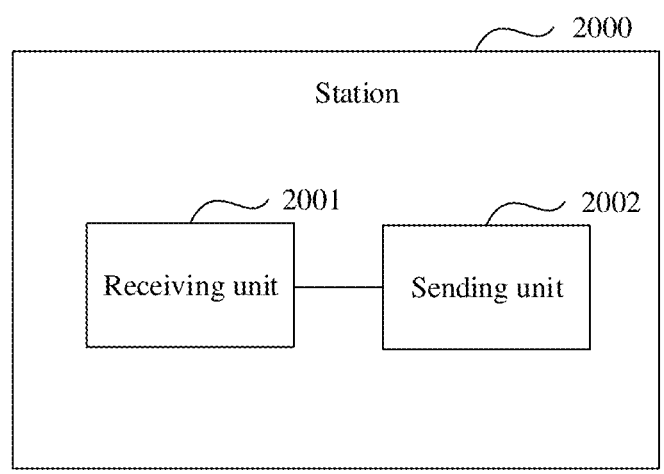
FIG. 20 is a structural diagram of a station according to an embodiment.

Based on the foregoing embodiments, an embodiment provides a station. The station is applied to the communications system shown in FIG. 2b, and is configured to implement the communication methods shown in the foregoing figures. A plurality of access points in the communications system form an access point set, and the access point set includes a control access point and a member access point. As shown in FIG. 20, the station 2000 includes a receiving unit 2001 and a sending unit 2002.

The receiving unit 2001 is configured to receive at least one first frame sent by an access point in the access point set. The first frame includes a sending address and an antenna identifier of the first frame, and an antenna corresponding to the antenna identifier is used when the access point sends the first frame.

The access point set includes the control access point and the member access point, first frames sent by different access points in the access point set include the same sending address, and the sending address includes an identifier of the control access point or an identifier of the access point set.

The sending unit 2002 is configured to send a service request frame to the access point. The service request frame includes a specified antenna identifier used by the access point that can provide a communication service for the station, and the specified antenna identifier is an antenna identifier included in a first frame that is in the at least one first frame and that meets a preset condition.

In a first implementation, the first frame that is in the at least one first frame and that meets the preset condition includes:
 a first frame that is in the at least one first frame and whose signal quality is greater than or equal to a preset threshold, and/or
 a first frame with best signal quality in the at least one first frame.

In a second implementation, the sending unit 2002 is further configured to send a second association request frame. The second association request frame is used by the station to request to associate with the access point set.

The receiving unit 2001 is further configured to receive a third parameter sent by an access point in the access point set. The third parameter includes a station identifier allocated to the station.

In a third implementation, a value range of the station identifier includes an association identifier AID that belongs to [1, 254], and/or an AID that is greater than 255, where the AID is an integer.

In a fourth implementation, the third parameter further includes a security key allocated to the station.

In a fifth implementation, the receiving unit 2001 is further configured to receive a service response frame sent by the access point in the access point set. The service response frame is used to instruct the access point to provide a communication service for the station.

According to the station provided in this embodiment, the station may implement beam training based on the first frame sent by the access point in the access point set. According to this solution, the station may select an antenna with relatively high transmission quality from a plurality of antennas used when the access point sends the first frame, to ensure that the antenna with relatively high transmission quality selected by the station may be used when the access point subsequently provides a service for the station, thereby ensuring signal transmission efficiency between the station and the access point.

It should be noted that, in the embodiments, division into the modules is an example and is merely logical function division, and may be other division in an actual implementation. In addition, functional units in the embodiments may be integrated into one processing unit, or may exist alone physically, or two or more than two units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the embodiments essentially, or the part contributing to the prior art, or all or some of the technical solutions may be implemented in a form of a software product. The software product is stored in a storage medium and includes several instructions for instructing a computer device (which may be a personal computer, a server, a network device, or the like) or a processor (processor) to perform all or some of the steps of the methods described in the embodiments. The foregoing storage medium includes various mediums that can store program code, such as a USB flash drive, a removable hard disk, a read-only memory (Read-Only Memory, ROM), a random access memory (Random Access Memory, RAM), a magnetic disk, or an optical disc.

Figure 21:
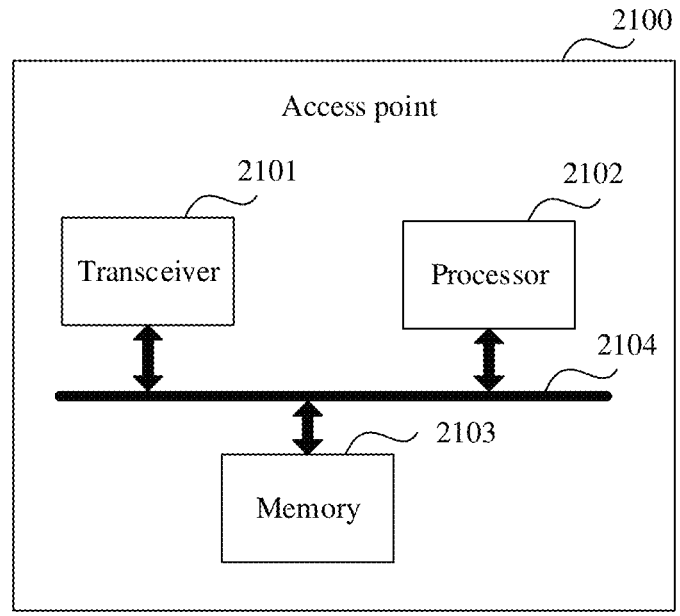
FIG. 21 is a structural diagram of another access point according to an embodiment.

Based on the foregoing embodiments, an embodiment further provides an access point. The access point may be applied to the communications system shown in FIG. 2b, and is configured to implement the communication methods shown in the foregoing figures. The access point has a function of the access point 1900 shown in FIG. 19. The access point is an access point in an access point set, and the access point set includes a control access point and a member access point. As shown in FIG. 21, the access point 2100 includes a transceiver 2101, a processor 2102, and a memory 2103. The transceiver 2101, the processor 2102, and the memory 2103 are connected to each other.

Optionally, the transceiver 2101, the processor 2102, and the memory 2103 are connected to each other by using a bus 2104. The bus 2104 may be a peripheral component interconnect (PCI) bus, an extended industry standard architecture (EISA) bus, and or the like. The bus may be classified into an address bus, a data bus, a control bus, and the like. For ease of representation, only one thick line is used to represent the bus in FIG. 21, but this does not mean that there is only one bus or only one type of bus.

The transceiver 2101 is configured to send and receive data, to implement communication with another device in the communications system.

The processor 2102 is configured to implement the communication methods provided in the embodiments shown in the foregoing figures, including:
 sending a first frame to a station by using the transceiver 2101, where the first frame includes a sending address and an antenna identifier, and an antenna corresponding to the antenna identifier is used when the access point sends the first frame, and
 First frames sent by different access points in the access point set include the same sending address, and the sending address includes an identifier of the control access point or an identifier of the access point set.

When the access point 2100 is the control access point in the access point set, the access point 2100 includes the following first to tenth implementations:

In a first implementation, the processor 2102 is further configured to: allocate a first parameter to the access point in the access point set, where
the first parameter includes at least one of the following: the identifier of the control access point, an identifier of the member access point, a first set, and a second set,
the first set includes at least one antenna identifier of the access point, and
the second set includes at least one station identifier, and the at least one station identifier is allocated by the access point to the station; and
send the first parameter to the member access point by using the transceiver 2101.

In a second implementation, the first parameter further includes a third set. The third set includes at least one security key, and the at least one security key is allocated by the access point to the station.

In a third implementation, when sending the first parameter to the member access point by using the transceiver 2101, the processor 2102 may be configured to:
send a second frame to the member access point by using the transceiver 2101, where the second frame carries the first parameter.

In a fourth implementation, the processor 2102 is further configured to:
before sending the first parameter to the member access point by using the transceiver 2101, receive, by using the transceiver 2101, a parameter request frame sent by the member access point, where the parameter request frame is used to request to obtain the first parameter.

In a fifth implementation, the parameter request frame includes a first association request frame, and the first association request frame instructs the member access point to request to associate with the control access point.

In a sixth implementation, the parameter request frame further includes a quantity of antennas supported by the member access point.

In a seventh implementation, the processor 2102 is further configured to:
receive, by using the transceiver 2101, a third frame sent by the member access point, where the third frame includes a station identifier that belongs to the second set.

In an eighth implementation, the processor 2102 is further configured to:
receive, by using the transceiver 2101, a fourth frame sent by the member access point, where the fourth frame includes a security key that belongs to the third set.

In a ninth implementation, a value range of the identifier of the member access point includes an association identifier AID that belongs to [1, 254], and/or an AID that is greater than 255; and/or
a value range of the identifier of the control access point includes at least one of the following: an AID that is equal to 0, an AID that belongs to [1, 254], and an AID that is greater than 255; and/or
a value range of the station identifier includes an AID that belongs to [1, 254], and/or an AID that is greater than 255, where
the AID is an integer.

In a tenth implementation, the processor 2102 is further configured to:
if at least one access point in the access point set receives a service request frame sent by the station, where the service request frame is used by the station to request the access point set to provide a communication service, determine one target access point from the at least one access point in the access point set; and
when the determined target access point is the control access point, provide a communication service for the station; or
when the determined target access point is the member access point in the access point set, send instruction information to the member access point by using the transceiver 2101, where the instruction information is used to instruct the member access point to provide a communication service for the station.

When a type of the access point 2100 is not limited, in other words, the access point 2100 may be the control access point in the access point set, or may be the member access point, the access point 2100 further includes the following eleventh to seventeenth implementations:

In an eleventh implementation, the identifier of the access point set is the AID that is equal to 0.

In a twelfth implementation, the processor 2102 is further configured to:
receive, by using the transceiver 2101, the service request frame sent by the station; and
provide the communication service for the station.

In a thirteenth implementation, the service request frame includes a specified antenna identifier used by an access point that can provide a communication service for the station.

The processor 2102 is further configured to:
before the communication service is provided for the station, determine that the at least one antenna identifier of the access point includes the specified antenna identifier.

In a fourteenth implementation, the processor 2102 is further configured to:
receive, by using the transceiver 2101, a second parameter of the station that is sent by an original access point of the station, where the original access point is a previous access point that is in the access point set and that provides a communication service for the station; and
provide the communication service for the station.

In a fifteenth implementation, the second parameter includes at least one of the following: a station identifier of the station and a security key of the station.

In a sixteenth implementation, when receiving, by using the transceiver 2101, the second parameter sent by the original access point, the processor 2102 may be configured to:
receive, by using the transceiver 2101 and the control access point, the second parameter sent by the original access point; or
directly receive the second parameter from the original access point by using the transceiver 2101.

In a seventeenth implementation, the processor 2102 is further configured to:
before the communication service is provided for the station, send a service response frame to the station by using the transceiver 2101, where the service response frame is used to instruct the access point to provide a communication service for the station.

When the access point 2100 is the member access point in the access point set, the access point 2100 further includes the following seventeenth to twenty-first implementations:

In a seventeenth implementation, the processor 2102 is further configured to receive, by using the transceiver 2101, the first parameter sent by the control access point in the access point set.

In an eighteenth implementation, when receiving, by using the transceiver 2101, the first parameter sent by the control access point in the access point set, the processor 2102 may be configured to:
  receive, by using the transceiver 2101, a second frame that is sent by the control access point and that carries the first parameter.

In a nineteenth implementation, the processor 2102 is further configured to:
  before receiving, by using the transceiver 2101, the second frame that is sent by the control access point and that carries the first parameter, send a parameter request frame to the control access point by using the transceiver 2101, where the parameter request frame is used to request to obtain the first parameter.

In a twentieth implementation, the processor 2102 is further configured to:
  before sending the parameter request frame to the control access point by using the transceiver 2101, receive, by using the transceiver 2101, a second association request frame sent by the station, where the second association request frame is used by the station to request to associate with the access point set.

In a twenty-first implementation, the processor 2102 is further configured to:
  send a third frame to the control access point, where the third frame includes a station identifier that belongs to the second set.

In a twenty-second implementation, the processor 2102 is further configured to:
  send a fourth frame to the control access point, where the fourth frame includes a security key that belongs to the third set.

The memory 2103 is configured to store a computer program, an instruction, and the like. For example, the computer program and the instruction may include program code, and the program code includes a computer operation instruction. The memory 2103 may be a random access memory (RAM), or may be a non-volatile memory (non-volatile memory), for example, at least one magnetic disk memory. The processor 2102 executes the program instruction and the instruction stored in the memory 2103, to implement the foregoing functions, thereby implementing the communication methods provided in the foregoing embodiments.

Figure 22:
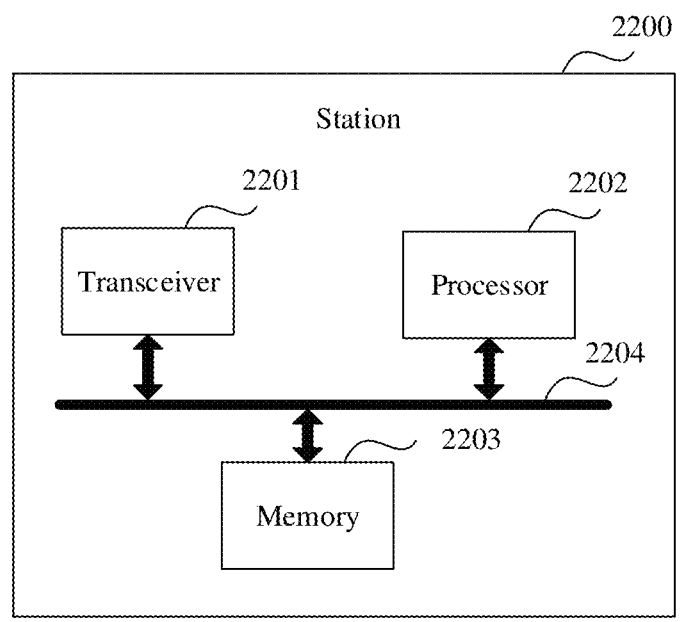
FIG. 22 is a structural diagram of another station according to an embodiment.

Based on the foregoing embodiments, an embodiment provides a station. The station is applied to the communications system shown in FIG. 2b, is configured to implement the communication methods shown in the foregoing figures, and has a function of the station 2000 shown in FIG. 20. A plurality of access points in the communications system form an access point set, and the access point set includes a control access point and a member access point. As shown in FIG. 22, the station 2200 includes a transceiver 2201, a processor 2202, and a memory 2203. The transceiver 2201, the processor 2202, and the memory 2203 are connected to each other.

Optionally, the transceiver 2201, the processor 2202, and the memory 2203 are connected to each other by using a bus 2204. The bus 2204 may be a PCI bus, an EISA bus, or the like. The bus may be classified into an address bus, a data bus, a control bus, and the like. For ease of representation, only one thick line is used to represent the bus in FIG. 22, but this does not mean that there is only one bus or only one type of bus.

The transceiver 2201 is configured to send and receive data, to implement communication with another device in the communications system.

The processor 2202 is configured to implement the communication methods provided in the embodiments shown in the foregoing figures, including:
  receiving, by using the transceiver 2201, at least one first frame sent by an access point in the access point set, where the first frame includes a sending address and an antenna identifier of the first frame, and an antenna corresponding to the antenna identifier is used when the access point sends the first frame, and
  the access point set includes the control access point and the member access point, first frames sent by different access points in the access point set include the same sending address, and the sending address includes an identifier of the control access point or an identifier of the access point set; and
  send a service request frame to the access point by using the transceiver 2201, where the service request frame includes a specified antenna identifier used by the access point that can provide a communication service for the station, and the specified antenna identifier is an antenna identifier included in a first frame that is in the at least one first frame and that meets a preset condition.

In a first implementation, the first frame that is in the at least one first frame and that meets the preset condition includes:
  a first frame that is in the at least one first frame and whose signal quality is greater than or equal to a preset threshold, and/or
  a first frame with best signal quality in the at least one first frame.

In a second implementation, the processor 2202 is further configured to:
  send a second association request frame by using the transceiver 2201, where the second association request frame is used by the station to request to associate with the access point set; and
  receive, by using the transceiver 2201, a third parameter sent by an access point in the access point set, where the third parameter includes a station identifier allocated to the station.

In a third implementation, a value range of the station identifier includes an association identifier AID that belongs to [1, 254], and/or an AID that is greater than 255, where the AID is an integer.

In a fourth implementation, the third parameter further includes a security key allocated to the station.

In a fifth implementation, the processor 2201 is further configured to:
  receive, by using the transceiver 2201, a service response frame sent by the access point in the access point set, where the service response frame is used to instruct the access point to provide a communication service for the station.

The memory 2203 is configured to store a computer program, an instruction, and the like. For example, the computer program and the instruction may include program code, and the program code includes a computer operation instruction. The memory 2203 may be a random access memory, or may be a non-volatile memory, for example, at least one magnetic disk memory. The processor 2202 executes the program instruction and the instruction stored in the memory 2203, to implement the foregoing functions, thereby implementing the communication methods provided in the foregoing embodiments.

Based on the foregoing embodiments, an embodiment further provides a communications system. The communications system includes an access point and a station that are configured to implement the communication methods provided in the embodiments shown in the foregoing figures.

Based on the foregoing embodiments, an embodiment provides a program. When being executed by a processor, the program is used to perform the communication methods provided in the foregoing embodiments.

Based on the foregoing embodiments, an embodiment provides a program product, for example, a computer readable storage medium, including the program in the foregoing embodiment.

Based on the foregoing embodiments, an embodiment provides a chip. The chip is configured to read and execute a computer program stored in the memory, to implement the communication methods in the foregoing embodiments.

Based on the foregoing embodiments, an embodiment provides a chip system. The chip system includes a processor, configured to support an access point or a station to implement a corresponding function in the foregoing embodiments. In a possible design, the chip system further includes a memory, and the memory is configured to store a program instruction and data that are necessary for a device. The chip system may include a chip, or may include a chip and another discrete device.

In conclusion, the embodiments provide a communications method and device. In this solution, an access point set includes a control access point and a member access point, first frames sent by different access points in the access point set to a station include a same sending address, and the sending address may include an identifier of the control access point in the access point set or an identifier of the access point set. According to this solution, when the station moves or changes a direction, an access point that provides a communication service for the station changes from one access point in the access point set to another access point. Because first frames sent by access points in the access point set include a same sending address, the station may consider the access point set as one access point. In this way, the station does not need to perform an access point switching process, thereby avoiding station service interruption and signaling overheads that are caused by the access point switching process.

A person skilled in the art should understand that the embodiments may be provided as a method, a system, or a computer program product. Therefore, the embodiments may use a form of hardware only embodiments, software only embodiments, or embodiments with a combination of software and hardware. Moreover, the embodiments may use a form of a computer program product that is implemented on one or more computer-usable storage media (including but not limited to a magnetic disk memory, a CD-ROM, an optical memory, and the like) that include computer-usable program code.

is the embodiments are described with reference to the flowcharts and/or block diagrams of the method, the device (system), and the computer program product. It should be understood that, computer program instructions may be used to implement each process and/or each block in the flowcharts and/or the block diagrams, and a combination of a process and/or a block in the flowcharts and/or the block diagrams. These computer program instructions may be provided for a general-purpose computer, a special-purpose computer, an embedded processor, or a processor of any other programmable data processing device to produce a machine, so that the instructions executed by the computer or the processor of any other programmable data processing device generate an apparatus for implementing a specific function in one or more processes in the flowcharts and/or one or more blocks in the block diagrams.

These computer program instructions may be stored in a computer-readable memory that can instruct the computer or the any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto the computer or the any other programmable data processing device, so that a series of operations and steps are performed on the computer or the any other programmable device, thereby generating computer-implemented processing. Therefore, the instructions executed on the computer or the any other programmable device provide steps for implementing a specific function in one or more processes in the flowcharts and/or in one or more blocks in the block diagrams.

Definitely, a person skilled in the art may make various modifications and variations to the embodiments without departing from the spirit and scope. The embodiments are intended to cover these modifications and variations provided that they fall within the scope of the claims and their equivalent technologies.

What is claimed is:

1. An access point in an access point set having a plurality of access points, the access point set including a control access point and a member access point, the access point comprising:
    a processing unit, configured to generate a first frame;
    a communications unit, configured to send the first frame to a station, wherein the first frame includes a sending address and an antenna identifier, and an antenna corresponding to the antenna identifier is used when the access point sends the first frame, wherein the antenna identifier corresponding to each antenna of each access point in the access point set is unique in the access point set; and
    first frames sent by different access points in the access point set include the same sending address, the station considers the access point set as one virtual access point, and the sending address includes an identifier of the control access point or an identifier of the access point set;
    wherein when the access point is the control access point, the processing unit is further configured to allocate a first parameter to each access point in the access point set,
    the first parameter includes at least one of the following: the identifier of the control access point, an identifier of the member access point, a first set, and a second set,
    the first set includes at least one antenna identifier of the access point,
    the second set includes at least one station identifier allocated by the access point to the station; and
    the communications unit is further configured to send the first parameter to the member access point.

2. The access point according to claim 1, wherein the first parameter further includes a third set, the third set includes at least one security key allocated by the access point to the station.

3. The access point according to claim 1, wherein when sending the first parameter to the member access point, the communications unit is configured to:
send a second frame to the member access point, wherein the second frame carries the first parameter.

4. The access point according to claim 1, wherein the receiving unit is further configured to:
receive a parameter request frame sent by the member access point before sending the first parameter to the member access point, wherein the parameter request frame is used to request to obtain the first parameter.

5. The access point according to claim 4, wherein the parameter request frame includes a first association request frame that instructs the member access point to request to associate with the control access point.

6. A communication method, comprising:
receiving, by a station, at least one first frame sent by an access point in an access point set having a plurality of access points, wherein the station considers the access point set as one virtual access point, the first frame includes a sending address and an antenna identifier of the first frame, an antenna corresponding to the antenna identifier is used when the access point sends the first frame, first frames sent by different access points in the access point set include the same sending address which includes an identifier of the control access point or an identifier of the access point set, wherein the antenna identifier corresponding to each antenna of each access point in the access point set is unique in the access point set;
sending, by the station, a service request frame to the access point, wherein the service request frame includes a specified antenna identifier used by the access point that is capable of providing a communication service for the station, and the specified antenna identifier is an antenna identifier included in a first frame that is in the at least one first frame and that meets a preset condition;
sending, by the station, a second association request frame, wherein the second association request frame is used by the station to request to associate with the access point set; and
receiving, by the station, a third parameter sent by an access point in the access point set, wherein the third parameter includes a station identifier allocated to the station;
wherein the third parameter further comprises a security key allocated to the station.

7. The method according to claim 6, wherein the first frame that is in the at least one first frame and that meets the preset condition comprises:
a first frame that is in the at least one first frame and whose signal quality is greater than or equal to a preset threshold, and/or
a first frame with a best signal quality in the at least one first frame.

8. The method according to claim 6, wherein a value range of the station identifier includes an association identifier (AID) that belongs to [1, 254], and/or an AID that is greater than 255, wherein the AID is an integer.

9. The method according to claim 6, wherein the method further comprises:
receiving, by the station, a service response frame sent by the access point in the access point set, wherein the service response frame is used to instruct the access point to provide a communication service for the station.

10. A station, wherein the station comprises:
a receiving unit, configured to receive at least one first frame sent by an access point in an access point set having a plurality of access points, wherein the station considers the access point set as one virtual access point, the first frame includes a sending address and an antenna identifier of the first frame, and an antenna corresponding to the antenna identifier is used when the access point sends the first frame, wherein the antenna identifier corresponding to each antenna of each access point in the access point set is unique in the access point set;
the access point set includes a control access point and a member access point, first frames sent by different access points in the access point set include the same sending address, and the sending address includes an identifier of the control access point or an identifier of the access point set;
a sending unit, configured to send a service request frame to the access point, wherein the service request frame includes a specified antenna identifier used by the access point that is capable of providing a communication service for the station, and the specified antenna identifier is an antenna identifier included in a first frame that is in the at least one first frame and that meets a preset condition;
the sending unit is further configured to send a second association request frame, wherein the second association request frame is used by the station to request to associate with the access point set; and
the receiving unit is further configured to receive a third parameter sent by an access point in the access point set, wherein the third parameter includes a station identifier allocated to the station;
wherein the third parameter further comprises a security key allocated to the station.

11. The station according to claim 10, wherein the first frame that is in the at least one first frame and that meets the preset condition comprises:
a first frame that is in the at least one first frame and whose signal quality is greater than or equal to a preset threshold, and/or
a first frame with a best signal quality in the at least one first frame.

12. The station according to claim 10, wherein a value range of the station identifier includes an association identifier (AID) that belongs to [1, 254], and/or an AID that is greater than 255, wherein the AID is an integer.

13. The station according to claim 10, wherein the receiving unit is further configured to:
receive a service response frame sent by the access point in the access point set, wherein the service response frame is used to instruct the access point to provide a communication service for the station.

* * * * *